US010208677B2

(12) United States Patent
Minto et al.

(10) Patent No.: US 10,208,677 B2
(45) Date of Patent: Feb. 19, 2019

(54) GAS TURBINE LOAD CONTROL SYSTEM

(71) Applicants: General Electric Company, Schenectady, NY (US); ExxonMobil Upstream Research Company, Houston, TX (US)

(72) Inventors: Karl Dean Minto, Ballston Lake, NY (US); Jonathan Carl Thatcher, Pendleton, SC (US); Brian Allen Rittenhouse, Simpsonville, SC (US); Aaron Vorel, Greenville, SC (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 675 days.

(21) Appl. No.: 14/144,511

(22) Filed: Dec. 30, 2013

(65) Prior Publication Data

US 2015/0226133 A1    Aug. 13, 2015

Related U.S. Application Data

(60) Provisional application No. 61/747,962, filed on Dec. 31, 2012.

(51) Int. Cl.
*F02C 7/22* (2006.01)
*F02C 1/00* (2006.01)
(Continued)

(52) U.S. Cl.
CPC ............... *F02C 9/48* (2013.01); *F01D 15/10* (2013.01); *F02C 3/34* (2013.01); *F02C 9/52* (2013.01);
(Continued)

(58) Field of Classification Search
CPC .... F02C 1/005; F02C 1/08; F02C 3/34; F02C 7/22; Y02E 20/14
See application file for complete search history.

(56) References Cited

U.S. PATENT DOCUMENTS 2,488,911 A    11/1949   Hepburn et al.
2,884,758 A    5/1959    Oberle
(Continued)

FOREIGN PATENT DOCUMENTS

CA    2231749    9/1998
CA    2645450    9/2007
(Continued)

OTHER PUBLICATIONS

Cho, J. H. et al. (2005) "Marrying LNG and Power Generation," Energy Markets; 10, 8; ABI/INFORM Trade & Industry, 5 pgs.
(Continued)

*Primary Examiner* — Todd E Manahan
*Assistant Examiner* — Eric Linderman
(74) *Attorney, Agent, or Firm* — Fletcher Yoder P.C.

(57) ABSTRACT

A gas turbine system includes a combustor configured to combust an oxidant and a fuel in the presence of an exhaust gas diluent to produce combustion products, an oxidant supply path fluidly coupled to the combustor and configured to flow the oxidant to the combustor at an oxidant flow rate, and a turbine configured to extract work from the combustion products to produce an exhaust gas used to generate the exhaust gas diluent. The turbine causes a shaft of the gas turbine system to rotate when the work is extracted from the combustion products. The system also includes an electrical generator that generates electrical power in response to rotation by the shaft, and a controller that performs load
(Continued)

control in response to a target load by adjusting the oxidant flow rate along the oxidant flow path as a primary load control parameter.

8 Claims, 9 Drawing Sheets

(51) Int. Cl.
  *F02C 3/34* (2006.01)
  *F02C 9/48* (2006.01)
  *F02C 9/52* (2006.01)
  *F02C 9/54* (2006.01)
  *F01D 15/10* (2006.01)
  *F02C 1/08* (2006.01)

(52) U.S. Cl.
  CPC ............... *F02C 9/54* (2013.01); *F02C 1/005* (2013.01); *F02C 1/08* (2013.01); *F02C 7/22* (2013.01); *F05D 2270/061* (2013.01); *F05D 2270/304* (2013.01); *Y02C 10/00* (2013.01); *Y02E 20/14* (2013.01); *Y02E 20/16* (2013.01)

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,703,807 A | 11/1972 | Rice |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,669 A * | 10/1978 | Heller ................. F02C 7/26 415/115 |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A * | 6/1981 | Earnest ................. F01K 23/10 60/39.181 |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child |
| 5,304,362 A | 4/1994 | Madsen |
| 5,325,660 A | 7/1994 | Taniguchi et al. |
| 5,332,036 A | 7/1994 | Shirley et al. |
| 5,339,620 A * | 8/1994 | Ikeda ................. F23R 3/26 60/39.27 |
| 5,344,307 A | 9/1994 | Schwartz et al. |
| 5,345,756 A | 9/1994 | Jahnke et al. |
| 5,355,668 A | 10/1994 | Weil |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,609,465 A * | 3/1997 | Batson ................. F01D 17/06 415/1 |
| 5,623,819 A * | 4/1997 | Bowker ................. F23C 6/047 60/723 |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A * | 3/1998 | Golomb ................. F01K 23/106 60/39.12 |
| 5,725,054 A | 3/1998 | Shayegi et al. |

(56) References Cited

U.S. PATENT DOCUMENTS

| | | | |
|---|---|---|---|
| 5,740,786 A | 4/1998 | Gartner | |
| 5,743,079 A | 4/1998 | Walsh et al. | |
| 5,765,363 A | 6/1998 | Mowill | |
| 5,771,867 A | 6/1998 | Amstutz et al. | |
| 5,771,868 A | 6/1998 | Khair | |
| 5,794,431 A * | 8/1998 | Utamura | F01K 23/101 |
| | | | 60/39.182 |
| 5,819,540 A | 10/1998 | Massarani | |
| 5,832,712 A | 11/1998 | Ronning et al. | |
| 5,836,164 A | 11/1998 | Tsukahara et al. | |
| 5,839,283 A | 11/1998 | Dobbeling | |
| 5,850,732 A | 12/1998 | Willis et al. | |
| 5,894,720 A | 4/1999 | Willis et al. | |
| 5,901,547 A | 5/1999 | Smith et al. | |
| 5,918,679 A * | 7/1999 | Cramer | A62C 3/06 |
| | | | 169/12 |
| 5,924,275 A | 7/1999 | Cohen et al. | |
| 5,930,990 A | 8/1999 | Zachary et al. | |
| 5,937,634 A | 8/1999 | Etheridge et al. | |
| 5,950,417 A | 9/1999 | Robertson, Jr. et al. | |
| 5,956,937 A | 9/1999 | Beichel | |
| 5,968,349 A | 10/1999 | Duyvesteyn et al. | |
| 5,974,780 A | 11/1999 | Santos | |
| 5,992,388 A | 11/1999 | Seger | |
| 6,016,658 A | 1/2000 | Willis et al. | |
| 6,032,465 A | 3/2000 | Regnier | |
| 6,035,641 A | 3/2000 | Lokhandwala | |
| 6,062,026 A | 5/2000 | Woollenweber et al. | |
| 6,079,974 A | 6/2000 | Thompson | |
| 6,082,093 A | 7/2000 | Greenwood et al. | |
| 6,089,855 A | 7/2000 | Becker et al. | |
| 6,094,916 A | 8/2000 | Puri et al. | |
| 6,101,983 A | 8/2000 | Anand et al. | |
| 6,148,602 A * | 11/2000 | Demetri | F01K 23/068 |
| | | | 60/39.12 |
| 6,170,264 B1 | 1/2001 | Viteri et al. | |
| 6,183,241 B1 | 2/2001 | Bohn et al. | |
| 6,201,029 B1 | 3/2001 | Waycuilis | |
| 6,202,400 B1 | 3/2001 | Utamura et al. | |
| 6,202,442 B1 | 3/2001 | Brugerolle | |
| 6,202,574 B1 | 3/2001 | Liljedahl et al. | |
| 6,209,325 B1 | 4/2001 | Alkabie | |
| 6,216,459 B1 | 4/2001 | Daudel et al. | |
| 6,216,549 B1 | 4/2001 | Davis et al. | |
| 6,230,103 B1 | 5/2001 | DeCorso et al. | |
| 6,237,339 B1 | 5/2001 | Åsen et al. | |
| 6,247,315 B1 | 6/2001 | Marin et al. | |
| 6,247,316 B1 | 6/2001 | Viteri | |
| 6,248,794 B1 | 6/2001 | Gieskes | |
| 6,253,555 B1 | 7/2001 | Willis | |
| 6,256,976 B1 | 7/2001 | Kataoka et al. | |
| 6,256,994 B1 | 7/2001 | Dillon, IV | |
| 6,263,659 B1 | 7/2001 | Dillon, IV et al. | |
| 6,266,954 B1 | 7/2001 | McCallum et al. | |
| 6,269,882 B1 | 8/2001 | Wellington et al. | |
| 6,276,171 B1 | 8/2001 | Brugerolle | |
| 6,282,901 B1 | 9/2001 | Marin et al. | |
| 6,283,087 B1 | 9/2001 | Isaksen | |
| 6,289,677 B1 | 9/2001 | Prociw et al. | |
| 6,298,652 B1 | 10/2001 | Mittricker et al. | |
| 6,298,654 B1 | 10/2001 | Vermes et al. | |
| 6,298,664 B1 | 10/2001 | Åsen et al. | |
| 6,301,888 B1 | 10/2001 | Gray, Jr. | |
| 6,301,889 B1 | 10/2001 | Gladden et al. | |
| 6,305,929 B1 | 10/2001 | Chung et al. | |
| 6,314,721 B1 | 11/2001 | Mathews et al. | |
| 6,324,867 B1 | 12/2001 | Fanning | |
| 6,332,313 B1 | 12/2001 | Willis et al. | |
| 6,345,493 B1 | 2/2002 | Smith et al. | |
| 6,360,528 B1 | 3/2002 | Brausch et al. | |
| 6,363,709 B2 | 4/2002 | Kataoka et al. | |
| 6,367,258 B1 | 4/2002 | Wen | |
| 6,370,870 B1 | 4/2002 | Kamijo et al. | |
| 6,374,591 B1 | 4/2002 | Johnson | |
| 6,374,594 B1 | 4/2002 | Kraft et al. | |
| 6,383,461 B1 | 5/2002 | Lang | |
| 6,389,814 B2 | 5/2002 | Viteri et al. | |
| 6,405,536 B1 | 6/2002 | Ho et al. | |
| 6,412,278 B1 | 7/2002 | Matthews | |
| 6,412,302 B1 | 7/2002 | Foglietta | |
| 6,412,559 B1 | 7/2002 | Gunter et al. | |
| 6,418,725 B1 | 7/2002 | Maeda et al. | |
| 6,429,020 B1 | 8/2002 | Thornton et al. | |
| 6,449,954 B2 | 9/2002 | Bachmann | |
| 6,450,256 B2 | 9/2002 | Mones | |
| 6,461,147 B1 | 10/2002 | Sonju et al. | |
| 6,467,270 B2 | 10/2002 | Mulloy et al. | |
| 6,470,682 B2 | 10/2002 | Gray, Jr. | |
| 6,477,859 B2 | 11/2002 | Wong et al. | |
| 6,484,503 B1 | 11/2002 | Raz | |
| 6,484,507 B1 | 11/2002 | Pradt | |
| 6,487,863 B1 | 12/2002 | Chen et al. | |
| 6,499,990 B1 | 12/2002 | Zink et al. | |
| 6,502,383 B1 | 1/2003 | Janardan et al. | |
| 6,505,567 B1 | 1/2003 | Anderson et al. | |
| 6,505,683 B2 | 1/2003 | Minkkinen et al. | |
| 6,508,209 B1 | 1/2003 | Collier, Jr. | |
| 6,523,349 B2 | 2/2003 | Viteri | |
| 6,532,745 B1 | 3/2003 | Neary | |
| 6,539,716 B2 | 4/2003 | Finger et al. | |
| 6,584,775 B1 | 7/2003 | Schneider et al. | |
| 6,598,398 B2 | 7/2003 | Viteri et al. | |
| 6,598,399 B2 | 7/2003 | Liebig | |
| 6,598,402 B2 * | 7/2003 | Kataoka | F02C 3/305 |
| | | | 60/39.3 |
| 6,606,861 B2 | 8/2003 | Snyder | |
| 6,612,291 B2 | 9/2003 | Sakamoto | |
| 6,615,576 B2 | 9/2003 | Sheoran et al. | |
| 6,615,589 B2 | 9/2003 | Allam et al. | |
| 6,622,470 B2 | 9/2003 | Viteri et al. | |
| 6,622,645 B2 | 9/2003 | Havlena | |
| 6,637,183 B2 | 10/2003 | Viteri et al. | |
| 6,644,041 B1 | 11/2003 | Eyermann | |
| 6,655,150 B1 | 12/2003 | Åsen et al. | |
| 6,668,541 B2 | 12/2003 | Rice et al. | |
| 6,672,863 B2 * | 1/2004 | Doebbeling | F23C 7/002 |
| | | | 431/115 |
| 6,675,579 B1 | 1/2004 | Yang | |
| 6,684,643 B2 | 2/2004 | Frutschi | |
| 6,694,735 B2 | 2/2004 | Sumser et al. | |
| 6,698,412 B2 | 3/2004 | Dalla Betta | |
| 6,702,570 B2 | 3/2004 | Shah et al. | |
| 6,722,436 B2 | 4/2004 | Krill | |
| 6,725,665 B2 | 4/2004 | Tuschy et al. | |
| 6,731,501 B1 | 5/2004 | Cheng | |
| 6,732,531 B2 | 5/2004 | Dickey | |
| 6,742,506 B1 | 6/2004 | Grandin | |
| 6,743,829 B2 | 6/2004 | Fischer-Calderon et al. | |
| 6,745,573 B2 | 6/2004 | Marin et al. | |
| 6,745,624 B2 | 6/2004 | Porter et al. | |
| 6,748,004 B2 | 6/2004 | Jepson | |
| 6,752,620 B2 | 6/2004 | Heier et al. | |
| 6,767,527 B1 | 7/2004 | Åsen et al. | |
| 6,772,583 B2 | 8/2004 | Bland | |
| 6,790,030 B2 | 9/2004 | Fischer et al. | |
| 6,805,483 B2 | 10/2004 | Tomlinson et al. | |
| 6,810,673 B2 | 11/2004 | Snyder | |
| 6,813,889 B2 | 11/2004 | Inoue et al. | |
| 6,817,187 B2 | 11/2004 | Yu | |
| 6,820,428 B2 | 11/2004 | Wylie | |
| 6,821,501 B2 | 11/2004 | Matzakos et al. | |
| 6,823,852 B2 | 11/2004 | Collier, Jr. | |
| 6,824,710 B2 | 11/2004 | Viteri et al. | |
| 6,826,912 B2 | 12/2004 | Levy et al. | |
| 6,826,913 B2 | 12/2004 | Wright | |
| 6,838,071 B1 | 1/2005 | Olsvik et al. | |
| 6,851,413 B1 | 2/2005 | Tamol, Sr. | |
| 6,868,677 B2 | 3/2005 | Viteri et al. | |
| 6,886,334 B2 | 5/2005 | Shirakawa | |
| 6,887,069 B1 | 5/2005 | Thornton et al. | |
| 6,899,859 B1 | 5/2005 | Olsvik | |
| 6,901,760 B2 | 6/2005 | Dittmann et al. | |
| 6,904,815 B2 | 6/2005 | Widmer | |
| 6,907,737 B2 | 6/2005 | Mittricker et al. | |

(56) References Cited

U.S. PATENT DOCUMENTS

| | | | |
|---|---|---|---|
| 6,910,335 B2 | 6/2005 | Viteri et al. | |
| 6,912,856 B2 * | 7/2005 | Morgan | F02C 9/28 60/39.281 |
| 6,923,915 B2 | 8/2005 | Alford et al. | |
| 6,939,130 B2 | 9/2005 | Abbasi et al. | |
| 6,945,029 B2 | 9/2005 | Viteri | |
| 6,945,052 B2 | 9/2005 | Frutschi et al. | |
| 6,945,087 B2 | 9/2005 | Porter et al. | |
| 6,945,089 B2 | 9/2005 | Barie et al. | |
| 6,946,419 B2 | 9/2005 | Kaefer | |
| 6,969,123 B2 | 11/2005 | Vinegar et al. | |
| 6,971,242 B2 | 12/2005 | Boardman | |
| 6,981,358 B2 | 1/2006 | Bellucci et al. | |
| 6,988,549 B1 | 1/2006 | Babcock | |
| 6,993,901 B2 | 2/2006 | Shirakawa | |
| 6,993,916 B2 | 2/2006 | Johnson et al. | |
| 6,994,491 B2 | 2/2006 | Kittle | |
| 7,007,487 B2 | 3/2006 | Belokon et al. | |
| 7,010,921 B2 | 3/2006 | Intile et al. | |
| 7,011,154 B2 | 3/2006 | Maher et al. | |
| 7,015,271 B2 | 3/2006 | Bice et al. | |
| 7,031,812 B1 * | 4/2006 | Pettigrew | B64C 27/06 340/945 |
| 7,032,388 B2 | 4/2006 | Healy | |
| 7,040,400 B2 | 5/2006 | de Rouffignac et al. | |
| 7,043,898 B2 | 5/2006 | Rago | |
| 7,043,920 B2 | 5/2006 | Viteri et al. | |
| 7,045,553 B2 | 5/2006 | Hershkowitz | |
| 7,053,128 B2 | 5/2006 | Hershkowitz | |
| 7,056,482 B2 | 6/2006 | Hakka et al. | |
| 7,059,152 B2 | 6/2006 | Oakey et al. | |
| 7,065,953 B1 | 6/2006 | Kopko | |
| 7,065,972 B2 | 6/2006 | Zupanc et al. | |
| 7,074,033 B2 | 7/2006 | Neary | |
| 7,077,199 B2 | 7/2006 | Vinegar et al. | |
| 7,089,743 B2 | 8/2006 | Frutschi et al. | |
| 7,096,942 B1 | 8/2006 | de Rouffignac et al. | |
| 7,097,925 B2 | 8/2006 | Keefer | |
| 7,104,319 B2 | 9/2006 | Vinegar et al. | |
| 7,104,784 B1 | 9/2006 | Hasegawa et al. | |
| 7,124,589 B2 | 10/2006 | Neary | |
| 7,137,256 B1 | 11/2006 | Stuttaford et al. | |
| 7,137,623 B2 | 11/2006 | Mockry | |
| 7,143,572 B2 | 12/2006 | Ooka et al. | |
| 7,143,606 B2 | 12/2006 | Tranier | |
| 7,146,969 B2 | 12/2006 | Weirich | |
| 7,147,461 B2 | 12/2006 | Neary | |
| 7,148,261 B2 | 12/2006 | Hershkowitz et al. | |
| 7,152,409 B2 | 12/2006 | Yee et al. | |
| 7,162,875 B2 | 1/2007 | Fletcher et al. | |
| 7,168,265 B2 | 1/2007 | Briscoe et al. | |
| 7,168,488 B2 | 1/2007 | Olsvik et al. | |
| 7,183,328 B2 | 2/2007 | Hershkowitz et al. | |
| 7,185,497 B2 | 3/2007 | Dudebout et al. | |
| 7,194,869 B2 | 3/2007 | McQuiggan et al. | |
| 7,197,880 B2 | 4/2007 | Thornton et al. | |
| 7,217,303 B2 | 5/2007 | Hershkowitz et al. | |
| 7,225,623 B2 | 6/2007 | Koshoffer | |
| 7,237,385 B2 | 7/2007 | Carrea | |
| 7,284,362 B2 | 10/2007 | Marin et al. | |
| 7,299,619 B2 | 11/2007 | Briesch | |
| 7,299,868 B2 | 11/2007 | Zapadinski | |
| 7,302,801 B2 | 12/2007 | Chen | |
| 7,305,817 B2 | 12/2007 | Blodgett et al. | |
| 7,305,831 B2 | 12/2007 | Carrea et al. | |
| 7,313,916 B2 | 1/2008 | Pellizzari | |
| 7,318,317 B2 | 1/2008 | Carrea | |
| 7,343,742 B2 | 3/2008 | Wimmer et al. | |
| 7,353,655 B2 | 4/2008 | Bolis et al. | |
| 7,357,857 B2 | 4/2008 | Hart et al. | |
| 7,363,756 B2 | 4/2008 | Carrea et al. | |
| 7,363,764 B2 | 4/2008 | Griffin et al. | |
| 7,381,393 B2 | 6/2008 | Lynn | |
| 7,401,577 B2 | 7/2008 | Saucedo et al. | |
| 7,410,525 B1 | 8/2008 | Liu et al. | |
| 7,416,137 B2 | 8/2008 | Hagen et al. | |
| 7,434,384 B2 | 10/2008 | Lord et al. | |
| 7,438,744 B2 | 10/2008 | Beaumont | |
| 7,467,942 B2 | 12/2008 | Carroni et al. | |
| 7,468,173 B2 | 12/2008 | Hughes et al. | |
| 7,472,550 B2 | 1/2009 | Lear, Jr. et al. | |
| 7,481,048 B2 | 1/2009 | Harmon et al. | |
| 7,481,275 B2 | 1/2009 | Olsvik et al. | |
| 7,482,500 B2 | 1/2009 | Johann et al. | |
| 7,485,761 B2 | 2/2009 | Schindler et al. | |
| 7,488,857 B2 | 2/2009 | Johann et al. | |
| 7,490,472 B2 | 2/2009 | Lynghjem et al. | |
| 7,491,250 B2 | 2/2009 | Hershkowitz et al. | |
| 7,492,054 B2 | 2/2009 | Catlin | |
| 7,493,769 B2 | 2/2009 | Jangili | |
| 7,498,009 B2 | 3/2009 | Leach et al. | |
| 7,503,178 B2 * | 3/2009 | Bucker | C01B 3/386 60/39.17 |
| 7,503,948 B2 | 3/2009 | Hershkowitz et al. | |
| 7,506,501 B2 | 3/2009 | Anderson et al. | |
| 7,513,099 B2 | 4/2009 | Nuding et al. | |
| 7,513,100 B2 | 4/2009 | Motter et al. | |
| 7,516,626 B2 | 4/2009 | Brox et al. | |
| 7,520,134 B2 | 4/2009 | Durbin et al. | |
| 7,523,603 B2 | 4/2009 | Hagen et al. | |
| 7,536,252 B1 | 5/2009 | Hibshman, II et al. | |
| 7,536,873 B2 | 5/2009 | Nohlen | |
| 7,540,150 B2 | 6/2009 | Schmid et al. | |
| 7,559,977 B2 | 7/2009 | Fleischer et al. | |
| 7,562,519 B1 | 7/2009 | Harris et al. | |
| 7,562,529 B2 | 7/2009 | Kuspert et al. | |
| 7,566,394 B2 | 7/2009 | Koseoglu | |
| 7,574,856 B2 | 8/2009 | Mak | |
| 7,591,866 B2 | 9/2009 | Bose | |
| 7,594,386 B2 | 9/2009 | Narayanan et al. | |
| 7,610,752 B2 | 11/2009 | Dalla Betta et al. | |
| 7,610,759 B2 | 11/2009 | Yoshida et al. | |
| 7,611,681 B2 | 11/2009 | Kaefer | |
| 7,614,352 B2 | 11/2009 | Anthony et al. | |
| 7,618,606 B2 | 11/2009 | Fan et al. | |
| 7,631,493 B2 | 12/2009 | Shirakawa et al. | |
| 7,634,915 B2 | 12/2009 | Hoffmann et al. | |
| 7,635,408 B2 | 12/2009 | Mak et al. | |
| 7,637,093 B2 | 12/2009 | Rao | |
| 7,644,573 B2 | 1/2010 | Smith | |
| 7,650,744 B2 | 1/2010 | Varatharajan et al. | |
| 7,654,320 B2 | 2/2010 | Payton | |
| 7,654,330 B2 | 2/2010 | Zubrin et al. | |
| 7,655,071 B2 | 2/2010 | De Vreede | |
| 7,670,135 B1 | 3/2010 | Zink et al. | |
| 7,673,454 B2 | 3/2010 | Saito et al. | |
| 7,673,685 B2 | 3/2010 | Huntley Shaw et al. | |
| 7,674,443 B1 | 3/2010 | Davis | |
| 7,677,309 B2 | 3/2010 | Shaw et al. | |
| 7,681,394 B2 | 3/2010 | Haugen | |
| 7,682,597 B2 | 3/2010 | Blumenfeld et al. | |
| 7,690,204 B2 | 4/2010 | Drnevich et al. | |
| 7,691,788 B2 | 4/2010 | Tan et al. | |
| 7,695,703 B2 | 4/2010 | Sobolevskiy et al. | |
| 7,717,173 B2 | 5/2010 | Grott | |
| 7,721,543 B2 | 5/2010 | Massey et al. | |
| 7,726,114 B2 | 6/2010 | Evulet | |
| 7,734,408 B2 | 6/2010 | Shiraki | |
| 7,739,864 B2 | 6/2010 | Finkenrath et al. | |
| 7,749,311 B2 | 7/2010 | Saito et al. | |
| 7,752,848 B2 | 7/2010 | Balan et al. | |
| 7,752,850 B2 | 7/2010 | Laster et al. | |
| 7,753,039 B2 | 7/2010 | Harima et al. | |
| 7,753,972 B2 | 7/2010 | Zubrin et al. | |
| 7,762,084 B2 | 7/2010 | Martis et al. | |
| 7,763,163 B2 | 7/2010 | Koseoglu | |
| 7,763,227 B2 | 7/2010 | Wang | |
| 7,765,810 B2 | 8/2010 | Pfefferle | |
| 7,788,897 B2 | 9/2010 | Campbell et al. | |
| 7,789,159 B1 | 9/2010 | Bader | |
| 7,789,658 B2 | 9/2010 | Towler et al. | |
| 7,789,944 B2 | 9/2010 | Saito et al. | |
| 7,793,494 B2 | 9/2010 | Wirth et al. | |
| 7,802,434 B2 | 9/2010 | Varatharajan et al. | |

(56) References Cited

U.S. PATENT DOCUMENTS

| | | | |
|---|---|---|---|
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 * | 3/2011 | Hoffmann ................. F02C 3/02 60/39.5 |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 * | 5/2012 | Draper ..................... F02C 1/06 60/39.52 |
| 8,167,960 B2 | 5/2012 | Gil |
| 8,171,718 B2 * | 5/2012 | Gulen ..................... F01K 23/10 60/39.52 |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,365,537 B2 * | 2/2013 | Li ........................... F01K 23/105 60/39.182 |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 * | 4/2013 | Vollmer ................. F01K 23/103 122/7 B |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,484,975 B2 * | 7/2013 | West ..................... F01K 23/101 60/646 |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 9,353,940 B2 * | 5/2016 | Mittricker ................. F23C 9/00 |
| 9,399,950 B2 * | 7/2016 | Mittricker ................. F01K 23/10 |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0163288 A1 * | 8/2003 | Follin ..................... G07C 3/00 702/188 |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2004/0244381 A1 * | 12/2004 | Becker ..................... F01K 23/10 60/772 |
| 2005/0028529 A1 * | 2/2005 | Bartlett ..................... B01D 53/1475 60/772 |

(56) References Cited

U.S. PATENT DOCUMENTS

| | | |
|---|---|---|
| 2005/0107941 A1* | 5/2005 | Healy ................ F02C 9/28 701/100 |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0130957 A1* | 6/2007 | Hoffmann ............ C01B 3/38 60/780 |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1* | 1/2008 | Griffin ............... B01D 53/22 60/39.182 |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0083226 A1* | 4/2008 | Joshi ................ F02C 3/34 60/772 |
| 2008/0104958 A1* | 5/2008 | Finkenrath ......... B01D 53/00 60/605.2 |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare |
| 2008/0251234 A1 | 10/2008 | Wilson |
| 2008/0288120 A1* | 11/2008 | Lindenmuth ....... G05B 19/042 700/287 |
| 2008/0290719 A1 | 11/2008 | Kaminsky et al. |
| 2008/0309087 A1 | 12/2008 | Evulet et al. |
| 2009/0000762 A1 | 1/2009 | Wilson |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0125207 A1* | 5/2009 | Nomura ............. F02C 3/22 701/100 |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0261599 A1* | 10/2009 | Alston ............. B60L 15/2045 290/40 B |
| 2009/0262599 A1 | 10/2009 | Kohrs et al. |
| 2009/0284013 A1* | 11/2009 | Anand ............. B01D 53/8625 290/52 |
| 2009/0301054 A1* | 12/2009 | Simpson ............ F01K 23/10 60/39.15 |
| 2009/0301099 A1 | 12/2009 | Nigro |
| 2009/0326726 A1* | 12/2009 | Ippolito ............. H02J 3/14 700/291 |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1* | 5/2010 | Brautsch ............ F02C 3/30 60/772 |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1* | 12/2010 | Anderson ............. F01K 23/10 60/775 |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ElKady et al. |
| 2011/0088379 A1 | 4/2011 | Nanda |
| 2011/0110759 A1* | 5/2011 | Sanchez ............ F02C 6/04 415/1 |
| 2011/0126512 A1 | 6/2011 | Anderson |
| 2011/0126545 A1* | 6/2011 | Loeven, II ......... F02C 7/22 60/772 |
| 2011/0138766 A1 | 6/2011 | ElKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0289898 A1* | 12/2011 | Hellat ............. F01K 23/10 60/39.52 |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031101 A1* | 2/2012 | Hoffmann .......... F01D 17/141 60/772 |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0240590 A1* | 9/2012 | Hellat ............ F01D 25/08 60/772 |
| 2012/0247105 A1 | 10/2012 | Nelson et al. |
| 2012/0260660 A1 | 10/2012 | Kraemer et al. |
| 2012/0297781 A1* | 11/2012 | Manchikanti ........ F01D 11/24 60/772 |
| 2013/0086883 A1* | 4/2013 | Sander ............ F02C 3/34 60/39.52 |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1* | 4/2013 | Gupta ............. F02C 1/007 60/772 |
| 2013/0104562 A1 | 5/2013 | Oelfke et al. |
| 2013/0104563 A1 | 5/2013 | Oelfke et al. |

(56) References Cited

U.S. PATENT DOCUMENTS

| | | | |
|---|---|---|---|
| 2013/0125554 A1 | 5/2013 | Mittricker et al. | |
| 2013/0125555 A1 | 5/2013 | Mittricker et al. | |
| 2013/0125557 A1* | 5/2013 | Scipio | F02C 9/22 60/773 |
| 2013/0232980 A1 | 9/2013 | Chen et al. | |
| 2013/0269310 A1 | 10/2013 | Wichmann et al. | |
| 2013/0269311 A1 | 10/2013 | Wichmann et al. | |
| 2013/0269355 A1 | 10/2013 | Wichmann et al. | |
| 2013/0269356 A1 | 10/2013 | Butkiewicz et al. | |
| 2013/0269357 A1 | 10/2013 | Wichmann et al. | |
| 2013/0269358 A1 | 10/2013 | Wichmann et al. | |
| 2013/0269360 A1 | 10/2013 | Wichmann et al. | |
| 2013/0269361 A1 | 10/2013 | Wichmann et al. | |
| 2013/0269362 A1 | 10/2013 | Wichmann et al. | |
| 2013/0283808 A1 | 10/2013 | Kolvick | |
| 2013/0327050 A1* | 12/2013 | Slobodyanskiy | F23L 7/00 60/772 |
| 2013/0340404 A1* | 12/2013 | Hughes | F02C 7/08 60/39.52 |
| 2014/0000271 A1 | 1/2014 | Mittricker et al. | |
| 2014/0000273 A1 | 1/2014 | Mittricker et al. | |
| 2014/0007590 A1 | 1/2014 | Huntington et al. | |
| 2014/0013766 A1 | 1/2014 | Mittricker et al. | |
| 2014/0020398 A1 | 1/2014 | Mittricker et al. | |
| 2014/0083078 A1* | 3/2014 | Dinu | F02C 3/22 60/39.463 |
| 2014/0123624 A1* | 5/2014 | Minto | F23N 5/18 60/39.281 |
| 2014/0374109 A1* | 12/2014 | Denton | B01D 53/62 166/309 |
| 2015/0000290 A1* | 1/2015 | Joshi | F02C 3/30 60/772 |
| 2016/0134291 A1* | 5/2016 | Fetvedt | H03L 5/02 700/282 |
| 2016/0146705 A1* | 5/2016 | Berkcan | G01N 27/00 73/112.01 |

FOREIGN PATENT DOCUMENTS

| | | | |
|---|---|---|---|
| CN | 1104718 A | 7/1995 | |
| CN | 102177326 A | 9/2011 | |
| EP | 0770771 | 5/1997 | |
| EP | 0887530 A2 | 12/1998 | |
| GB | 776269 | 6/1957 | |
| GB | 2117053 | 10/1983 | |
| JP | S62075031 A | 4/1987 | |
| JP | 2010127242 A | 6/2010 | |
| WO | WO1999006674 | 2/1999 | |
| WO | WO1999063210 | 12/1999 | |
| WO | WO2007068682 | 6/2007 | |
| WO | WO2008142009 | 11/2008 | |
| WO | WO 2010044958 A1 * | 4/2010 | F23C 9/00 |
| WO | WO2011003606 | 1/2011 | |
| WO | 2012003078 A1 | 1/2012 | |
| WO | WO2012003489 | 1/2012 | |
| WO | WO 2012003489 A2 * | 1/2012 | F02C 9/00 |
| WO | 2012128923 A2 | 9/2012 | |
| WO | WO2012128928 | 9/2012 | |
| WO | WO2012128929 | 9/2012 | |
| WO | WO2012170114 | 12/2012 | |
| WO | WO2013147632 | 10/2013 | |
| WO | WO2013147633 | 10/2013 | |
| WO | WO2013155214 | 10/2013 | |
| WO | WO2013163045 | 10/2013 | |

OTHER PUBLICATIONS

Corti, A. et al. (1988) "Athabasca Mineable Oil Sands: The RTR/Gulf Extraction Process Theoretical Model of Bitumen Detachment," 4th UNITAR/UNDP Int'l Conf. on Heavy Crude and Tar Sands Proceedings, v.5, paper No. 81, Edmonton, AB, Canada, 4 pgs.

Nanda, R. et al. (2007) "Utilizing Air Based Technologies as Heat Source for LNG Vaporization," presented at the 86th Annual convention of the Gas Processors of America (GPA 2007), San Antonio, TX; 13 pgs.
Rosetta, M. J. et al. (2006) "Integrating Ambient Air Vaporization Technology with Waste Heat Recovery—A Fresh Approach to LNG Vaporization," presented at the 85th annual convention of the Gas Processors of America (GPA 2006), Grapevine, Texas, 22 pgs.
AU Patent Examination Report No. 1; Application No. AU2013369676; dated Nov. 30, 2015; 3 pages.
CN First Office Action and English Translation; Application No. CN 2013800740245; dated Apr. 29, 2016; 18 pages.
Ahmed, S. et al. (1998) "Catalytic Partial Oxidation Reforming of Hydrocarbon Fuels," *1998 Fuel Cell Seminar*, Nov. 16-19, 1998, 7 pgs.
Air Separation Technology Ion Transport Membrane—Air Products 2008.
Air Separation Technology Ion Transport Membrane—Air Products 2011.
Anderson, R. E. (2006) "Durability and Reliability Demonstration of a Near-Zero-Emission Gas-Fired Power Plant," *California Energy Comm.*, CEC 500-2006-074, 80 pgs.
Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.
Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.
BP Press Release (2006) "BP and Edison Mission Group Plan Major Hydrogen Power Project for California," Feburary 10, 2006, www.bp.com/hydrogenpower, 2 pgs.
Bryngelsson, M. et al. (2005) "Feasibility Study of CO2 Removal From Pressurized Flue Gas in a Fully Fired Combined Cycle—The Sargas Project," KTH—Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, Mar. 2002, 42 pgs.
Comparison of Ion Transport Membranes—Fourth Annual Conference on Carbon Capture and Sequestration DOE/NETL; May 2005.
Ciulia, Vincent. About.com. Auto Repair. How the Engine Works. 2001-2003.
Cryogenics. Science Clarified. 2012. http://www.scienceclarified.com/Co-Di/Cryogenics.html.
Defrate, L. A. et al. (1959) "Optimum Design of Ejector Using Digital Computers" Chem. Eng. Prog. Symp. Ser., 55 ( 21) pp. 46.
Ditaranto, M. et al. (2006) "Combustion Instabilities in Sudden Expansion Oxy-Fuel Flames," ScienceDirect, Combustion and Flame, v.146, Jun. 30, 2006, pp. 493-451.
Elwell, L. C. et al. (2005) "Technical Overview of Carbon Dioxide Capture Technologies for Coal-Fired Power Plants," *MPR Associates, Inc.*, Jun. 22, 2005, 15 pgs.
Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.
Ertesvag, I. S. et al. (2005) "Energy Analysis of a Gas-Turbin Combined-Cycle Power Plant With Precombustion $CO_2$ Capture," Elsivier, 2004, pp. 5-39.
Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.
Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.
http://www.turbineinletcooling.org/resources/papers/CTIC_WetCompression_Shepherd_ASMETurboExpo2011.pdf Jun. 2011.
Luby, P. et al. (2003) "Zero Carbon Power Generation: IGCC as the Premium Option," *Powergen International*, 19 pgs.

(56) References Cited

OTHER PUBLICATIONS

MacAdam, S. et al. (2008) "Coal-Based Oxy-Fuel System Evaluation and Combustor Development," *Clean Energy Systems, Inc.* 6 pgs.
Morehead, H. (2007) "Siemens Global Gasification and IGCC Update," *Siemens, Coal-Gen*, Aug. 3, 2007, 17 pgs.
Reeves, S. R. (2001) "Geological Sequestration of $CO_2$ in Deep, Unmineable Coalbeds: An Integrated Research and Commercial-Scale Field Demonstration Project," SPE 71749, 10 pgs.
Reeves, S. R. (2003) "Enhanced Coalbed Methane Recovery," SPE 101466-DL, 8 pgs.
Richards, G. A. et al. (2001) "Advanced Steam Generators," *National Energy Technology Laboratory*, 7 pgs.
Snarheim, D. et al. (2006) "Control Design for a Gas Turbine Cycle With $CO_2$ Capture Capabilities," *Modeling, Identification and Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.
vanHemert, P. et al. (2006) "Adsorption of Carbon Dioxide and a Hydrogen-Carbon Dioxide Mixture," *Intn'l Coalbed Methane Symposium* (Tuscaloosa, AL) Paper 0615, 9 pgs.
Zhu, J. et al. (2002) "Recovery of Coalbed Methane by Gas Injection," SPE 75255, 15 pgs.
U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
PCT/RU2013/000162, Feb. 28, 2013, General Electric Company.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, Apr. 10, 2013, General Electric Company/ExxonMobil Upstream Company.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.
Japanese Office Action for JP Application No. 2015-550869 dated Dec. 4, 2017; 5 Pages.
Chinese Office Action for CN Application No. 201380074024.5 dated Jun. 15, 2017; 19 pgs.

* cited by examiner

GAS TURBINE LOAD CONTROL SYSTEM

CROSS-REFERENCE TO RELATED APPLICATIONS

This application claims priority to and benefit of U.S. Provisional Patent Application No. 61/747,962, entitled "GAS TURBINE LOAD CONTROL SYSTEM," filed on Dec. 31, 2012, which is herein incorporated by reference in its entirety for all purposes.

BACKGROUND

The subject matter disclosed herein relates to gas turbine engines.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. The turbine stages, when driven by the hot combustion products, transfer rotational power to a shaft. The rotating shaft, in turn, drives one or more compressor stages of a compressor section to compress oxidant for intake into the combustor section, and can also drive an electrical generator to produce electrical energy.

In certain instances, the electrical energy supplied by the electrical generator may be fed into an electrical grid, such as an electrical grid of a municipality. The gas turbine may be configured to adjust its operation in response to changes in the municipality's electrical grid. For example, if the electrical grid slows, the gas turbine might increase its output of electrical energy to maintain the amount of electrical power available to the municipality. Increasing the amount of combustion in the gas turbine engine, which increases the speed of the shaft that drives the electrical generator, may enable such an increase in the electrical output.

As the combustion parameters change, such as the rate of combustion in the combustor section, the nature of the combustion products, such as the relative levels of particular gases in the combustion products (e.g., nitrogen oxide (NOx), carbon dioxide ($CO_2$), and oxygen ($O_2$)) can be affected. Unfortunately, certain ratios can lead to excessive levels of oxygen in the combustion products, which can be detrimental to the gas turbine system and downstream components. Furthermore, because the gas turbine engine system may include or be a part of other systems that operate as a result of the combustion process, the operation of these systems may also be affected, which can lead to process instabilities.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In one embodiment, a gas turbine system includes a turbine combustor configured to combust a compressed oxidant and a fuel in the presence of an exhaust gas diluent generated from an exhaust gas to produce combustion products; an oxidant supply path fluidly coupled to the turbine combustor and configured to flow the compressed oxidant to the turbine combustor at an oxidant flow rate; a turbine configured to extract work from the combustion products to produce an exhaust gas, wherein the turbine causes a shaft of the gas turbine system to rotate when the work is extracted from the combustion products; an electrical generator configured to generate electrical power in response to rotation by the shaft; and a controller, having: one or more tangible, non-transitory, machine readable media collectively storing one or more sets of instructions; and one or more processing devices configured to execute the one or more sets of instructions to: receive data indicative of a target load for the electrical generator; and perform load control in response to the target load by adjusting the oxidant flow rate along the oxidant flow path as a primary load control parameter, wherein adjusting the oxidant flow rate adjusts combustion within the turbine combustor to change a rotational speed of the shaft.

In another embodiment, a system includes one or more tangible, non-transitory, machine readable media collectively storing one or more sets of instructions executable by one or more processing devices to: receive a load reference indicative of a target loading for a gas turbine system; determine an oxidant flow rate associated with the target loading, wherein the oxidant flow rate corresponds to a flow of a compressed oxidant along an oxidant supply path from a main oxidant compression system to a turbine combustor of the gas turbine system; generate one or more oxidant flow control signals for input to the main oxidant compression system to cause the main oxidant compression system to adjust the flow of the compressed oxidant to the oxidant flow rate associated with the target loading; determine a fuel flow rate based on the oxidant flow rate associated with the target loading, wherein the fuel flow rate corresponds to a flow of a fuel along a fuel supply path to the turbine combustor; and generate one or more fuel flow control signals for input to a fuel flow control system, wherein the one or more fuel flow control signals are configured to cause the fuel flow control system to adjust the flow of the fuel to enable combustion at a target equivalence ratio between the fuel and the oxidant in the presence of an exhaust gas diluent within the turbine combustor.

In another embodiment, a gas turbine system includes: a turbine combustor configured to combust an oxidant and a fuel; a turbine driven by combustion products from the turbine combustor; an exhaust gas compressor driven by the turbine via a shaft, wherein the exhaust gas compressor is configured to compress and supply an exhaust gas to the turbine combustor as an exhaust gas diluent; an exhaust gas recirculation (EGR) system, wherein the EGR system is configured to recirculate the exhaust gas along an exhaust recirculation path from the turbine to the exhaust gas compressor; an electrical generator configured to generate electrical power in response to rotation by the shaft; and a controller, comprising: one or more tangible, non-transitory, machine readable media collectively storing one or more sets of instructions; and one or more processing devices configured to execute the one or more sets of instructions to: receive data indicative of a target load for the electrical generator; and perform load control in response to the target load by adjusting an exhaust flow rate of the exhaust gas recirculating along the exhaust recirculation path as a primary load control parameter, wherein adjusting the exhaust flow rate adjusts the operation of the turbine to change a rotational speed of the shaft.

In another embodiment, a gas turbine system includes: a turbine combustor configured to combust an oxidant and a fuel; a turbine driven by combustion products from the turbine combustor; an exhaust gas compressor driven by the turbine via a shaft, wherein the exhaust gas compressor is configured to compress and supply an exhaust gas to the turbine combustor as an exhaust gas diluent; an exhaust gas recirculation (EGR) system, wherein the EGR system is configured to recirculate the exhaust gas along an exhaust recirculation path from the turbine to the exhaust gas compressor; an exhaust extraction path configured to flow an amount of the exhaust gas diluent as an extracted exhaust gas from the exhaust gas compressor to a product gas path configured to deliver the extracted exhaust gas to a downstream process as a product gas; an electrical generator configured to generate electrical power in response to rotation by the shaft; and a controller, having: one or more tangible, non-transitory, machine readable media collectively storing one or more sets of instructions; and one or more processing devices configured to execute the one or more sets of instructions to: receive data indicative of a target load for the electrical generator; and perform load control in response to the target load by adjusting the amount of the extracted exhaust gas flowed to the product gas path.

In a further embodiment, a gas turbine system includes: a turbine combustor configured to combust an oxidant and a fuel; a turbine driven by combustion products from the turbine combustor; an exhaust gas compressor driven by the turbine via a shaft, wherein the exhaust gas compressor is configured to compress and supply an exhaust gas to the turbine combustor as an exhaust gas diluent; an exhaust gas recirculation (EGR) system, wherein the EGR system is configured to recirculate the exhaust gas along an exhaust recirculation path from the turbine to the exhaust gas compressor; an exhaust extraction path configured to flow an amount of the exhaust gas diluent as an extracted exhaust gas from the exhaust gas compressor to a product gas path configured to deliver the extracted exhaust gas to a downstream process as a product gas; an electrical generator configured to generate electrical power in response to rotation by the shaft; and a controller, having: one or more tangible, non-transitory, machine readable media collectively storing one or more sets of instructions; and one or more processing devices configured to execute the one or more sets of instructions to: receive data indicative of a target load for the electrical generator; and perform load control in response to the target load by adjusting the amount of the extracted exhaust gas flowed to the product gas path as the primary load control parameter, by adjusting an amount of the oxidant provided to the combustor as the primary load control parameter, or by adjusting a flow of the exhaust gas along the exhaust recirculation path as the primary load control parameter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
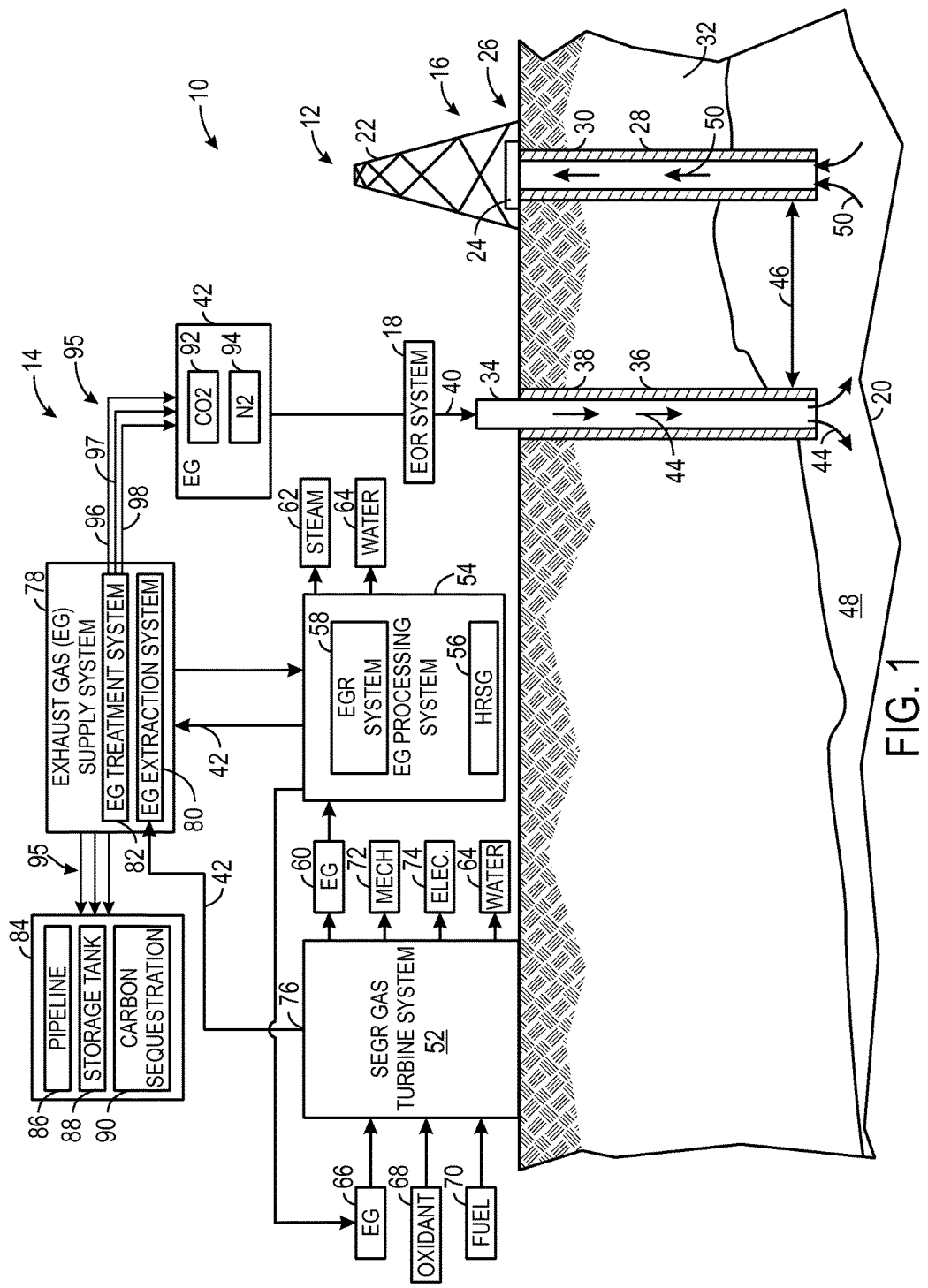
FIG. 1 is a diagram of an embodiment of a system having a turbine-based service system coupled to a hydrocarbon production system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. In addition to controlling the flow of the fuel and/or oxidant, the recirculation of the exhaust gas along with stoichiometric combustion may help to increase the concentration level of $CO_2$ in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units).

In addition, the loading and unloading of the gas turbine systems may be controlled based on a number of flows throughout the gas turbine system, where the loading on the system determines the level of electrical output available, for example to an electrical grid. The flows may include a flow of oxidant to the gas turbine engine for combustion, a flow of exhaust gas diluent into and out of the gas turbine engine, and a fuel flow into the gas turbine engine, to name a few. A control system may utilize any one or a combination of these flows as a main control parameter to control the manner in which the loading of the gas turbine engines is increased or reduced.

FIG. 1 is a diagram of an embodiment of a system 10 having an hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
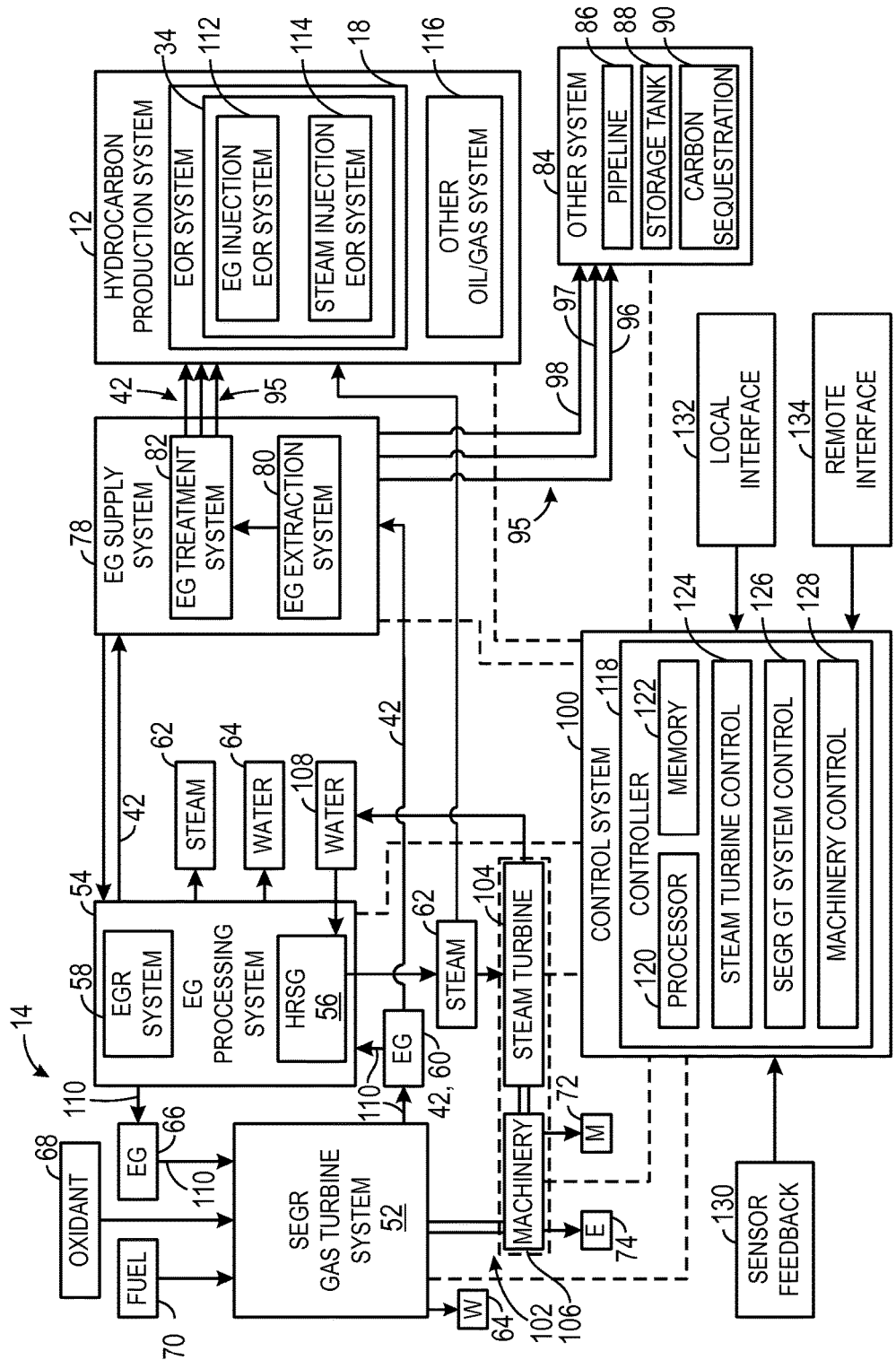
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_x$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_x$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
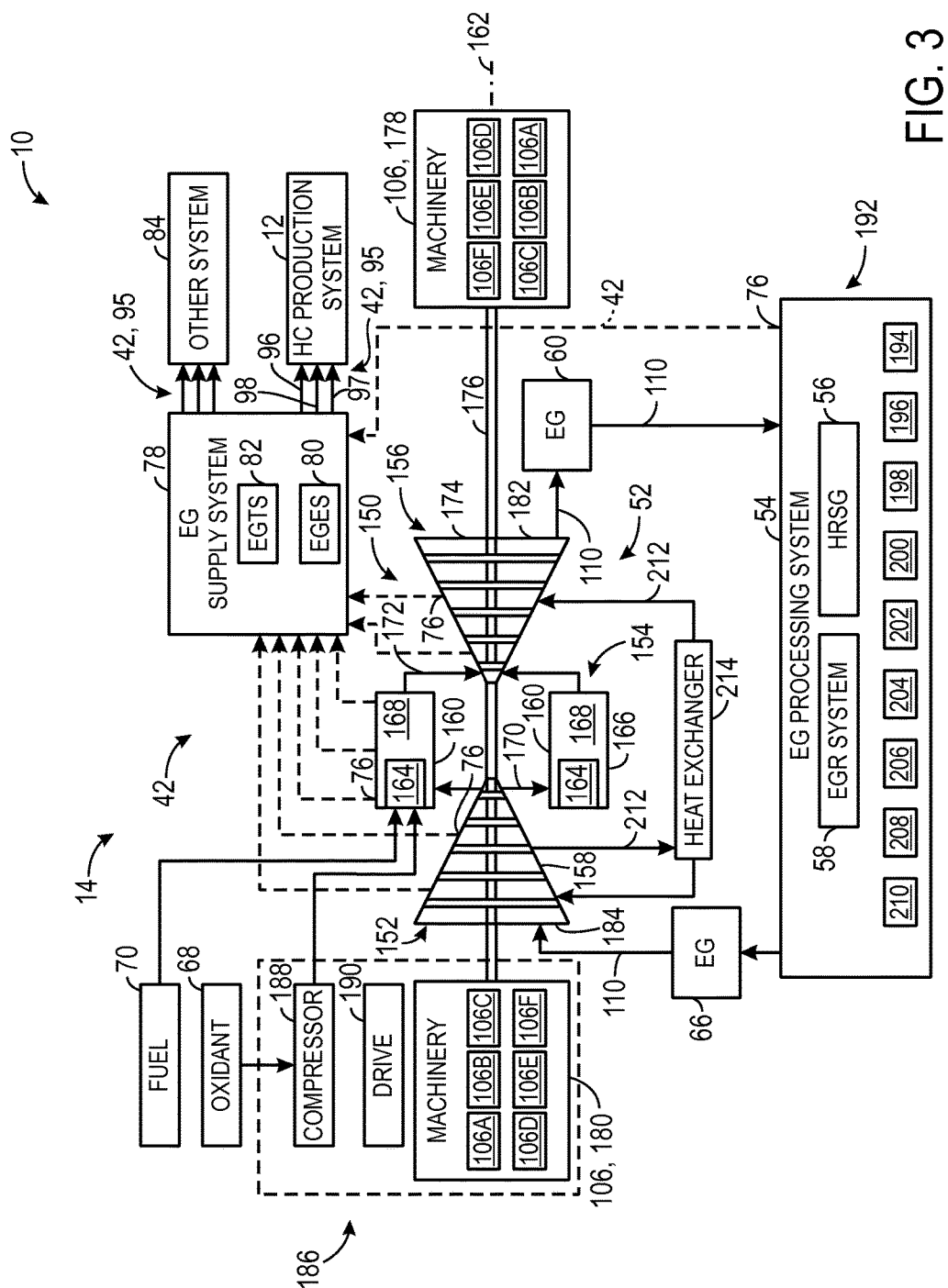
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion zone, either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. a steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|------|------|------|------|------|------|
| MOC | GEN | | | | |
| MOC | GBX | GEN | | | |
| LP MOC | HP MOC | GEN | | | |
| HP MOC | GBX | LP MOC | GEN | | |
| MOC | GBX | GEN | | | |
| MOC | | | | | |
| HP MOC | GBX | GEN | LP MOC | | |
| MOC | GBX | GEN | | | |
| MOC | GBX | DRV | | | |
| DRV | GBX | LP MOC | HP MOC | GBX | GEN |
| DRV | GBX | HP MOC | LP MOC | GEN | |
| HP | GBX | LP | GEN | | |
| MOC | CLR | MOC | | | |
| HP | GBX | LP | GBX | GEN | |
| MOC | CLR | MOC | | | |
| HP | GBX | LP | GEN | | |

TABLE 1-continued

| 106A | 106B | 106C | 106D | 106E | 106F |
|------|------|------|------|------|------|
| MOC | HTR STGN | MOC | | | |
| MOC | GEN | DRV | | | |
| MOC | DRV | GEN | | | |
| DRV | MOC | GEN | | | |
| DRV | CLU | MOC | GEN | | |
| DRV | CLU | MOC | GBX | GEN | |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location.

and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the CO$_2$ rich, N$_2$ lean stream 96, the intermediate concentration CO$_2$, N$_2$ stream 97, and the CO$_2$ lean, N$_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
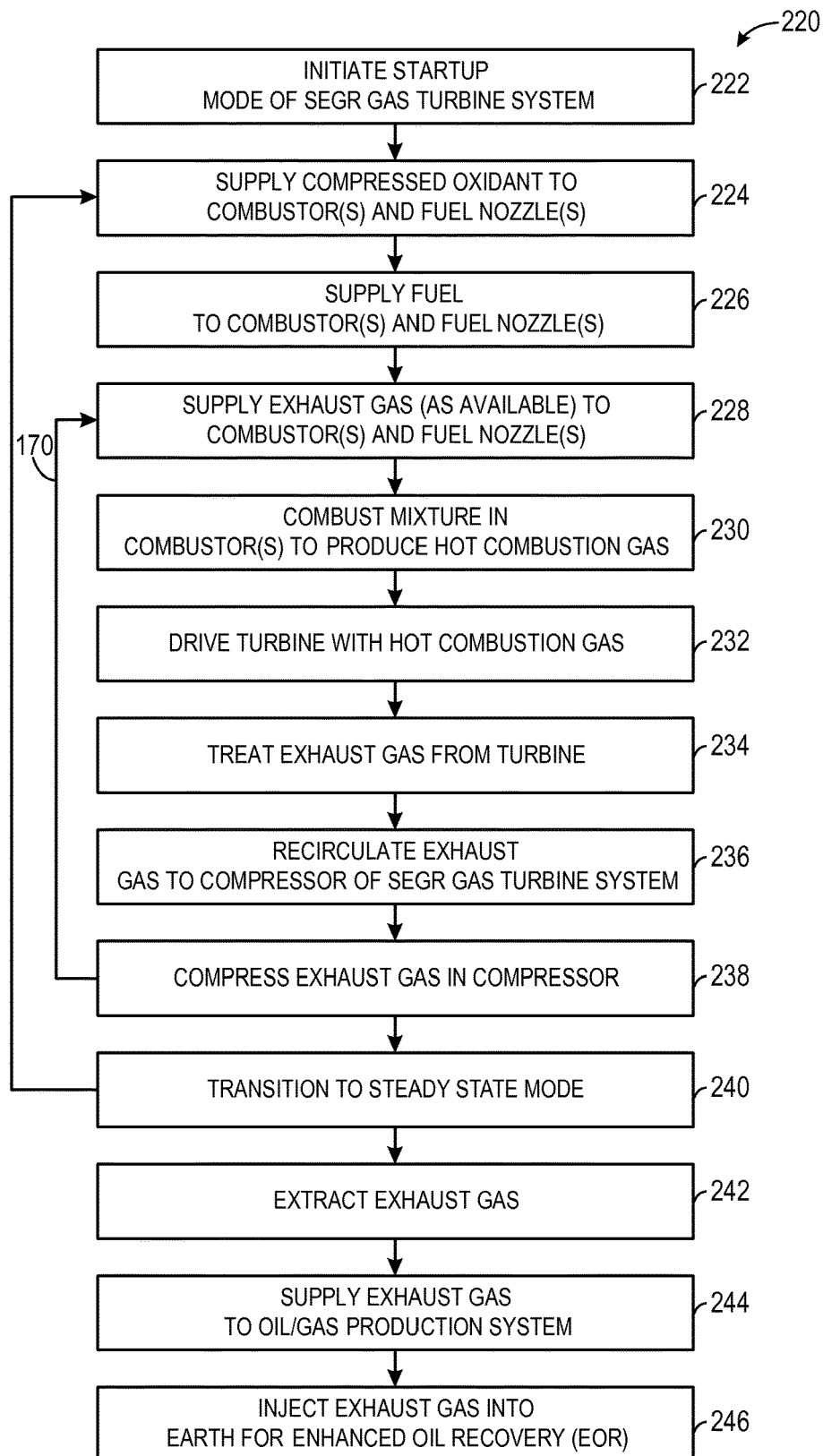
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

As noted above, the SEGR gas turbine system 52 may be utilized to produce, among other outputs, electrical power 74, which may in turn be used to power one or more features of the turbine-based service system 14, or may be provided as an electrical energy input to a power grid. Once synchronized with such a grid, the operation of the SEGR gas turbine system 52 may be adjusted to account for variations in the power grid. For example, the grid may be configured to operate at a certain predetermined frequency (e.g., a grid speed). When the frequency of the grid varies, the output of the electrical power 74 may also be adjusted. In situations where there is a drop in the frequency, commonly referred to as a "droop," for example, the SEGR gas turbine system 52 may increase its output to account for this droop to maintain the grid speed at the predetermined level. In accordance with present embodiments, the heat release by the combustor 160, for example in the hot combustion gases, is controlled to follow a grid load demand, and to respond to deviations in grid speed. As discussed in detail below, the heat release may be adjusting using a combination of flows through the SEGR gas turbine system 52, including any one or a combination of flows of the oxidant 68, fuel 70, exhaust gas 42, and the like.

Figure 5:
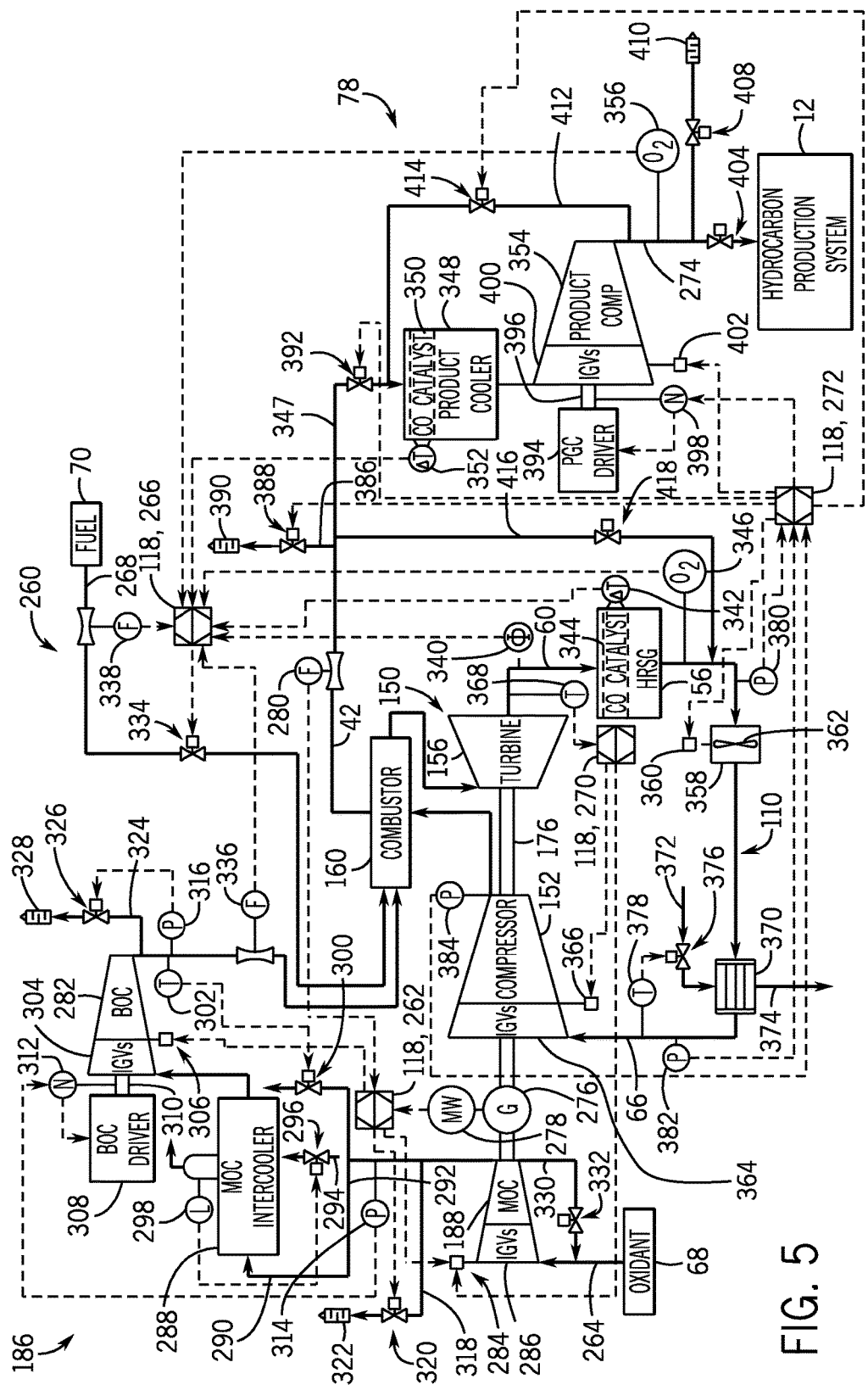
FIG. 5 is a diagram of an embodiment of the system of FIGS. 1-3, further illustrating details of a control system configured to load and unload the gas turbine system using various process streams.

One embodiment of a load control system 260 configured to control the operation of the SEGR gas turbine system 52 to follow the grid load demand and to account for variations in grid speed is depicted schematically in FIG. 5. Among various flow-adjusting features, the load control system 260 includes the controller 118, which may include a series of modules or computer programs capable of implementing the flow control techniques described herein. In one embodiment, the controller 118 may include one or more tangible, non-transitory, machine-readable media collectively storing one or more sets of instructions and one or more processing devices configured to execute the stored instructions to perform the load control techniques described herein. The one or more sets of instructions, for example, may collectively or individually include modules for adjusting one or more types of flows through the SEGR gas turbine system 52. It should be noted that the modules disclosed herein may be implemented at a centralized workstation (e.g., an on-site or off-site workstation as one or more applications), or a distributed system in which one or more workstations, panels, or automated controllers may be distributed throughout the SEGR gas turbine system 52, such as proximate various control valves, conduit junctions, and so forth.

For example, the controller 118 may include a first module 262 configured to adjust, among other things, a flow of the oxidant 68 along an oxidant supply path 264 extending from the oxidant compressor section 186 (e.g., the MOC 188) to the combustor section 154 (e.g., the combustor 160). In embodiments where the flow of the oxidant 68 is adjusted as a primary load control parameter (e.g., the first, main parameter adjusted in response to grid load demand or grid speed variation), the first module 262 may be considered to be an oxidant flow load control module that performs, among other functions, an oxidant flow load control routine.

The controller 118 also includes a second module 266 configured to adjust, among other things, a flow of the fuel 70 along a fuel supply path 268 extending to the combustor section 154 (e.g., the combustor 160). As discussed in detail below, the second module 266 may adjust the flow of the fuel 70 in response to a number of factors, including the flow of the oxidant 68, the flow of exhaust gas throughout the SEGR gas turbine system 52, various temperature and/or pressure indicators of these flows, and the like. In certain embodiments, the second module 266 may adjust the flow of the fuel 70 to achieve a target equivalence ratio of fuel to oxygen in the oxidant for combustion within the combustor 160. In such embodiments, the second module 266 may be considered to perform an equivalence ratio control routine. The target equivalence ratio may be defined by a user, or may be automatically determined based on variety of other input parameters, such as a desired composition for the exhaust gas, a target heat output by the combustor 160, and so forth.

The controller 118 also includes a third module 270 configured to adjust various flows, such as a flow of the oxidant 68 through the MOC 188, a flow of the exhaust gas 66 through the compressor section 152 (e.g., an exhaust gas compressor, a recycle compressor), a flow of the exhaust gas 60 through the exhaust recirculation path 110, and so on. Any one or a combination of parameters (e.g., pressure, flow rate, temperature) of the oxidant 68 and/or exhaust gas 66 may be adjusted in response to a number of factors, including the flow of the oxidant 68, the flow of exhaust gas throughout the SEGR gas turbine system 52, various temperature and/or pressure indicators of these flows, and the like. In certain embodiments, the third module 270 may adjust a temperature of the exhaust gas 66, which affects the temperature within the combustor 160, and may therefore be considered to perform a temperature control routine. Additionally or alternatively, the third module 270 may be configured to control/adjust the ratio of the oxidant 68 to the exhaust gas diluent in the combustor 160, and may therefore be considered to perform an oxidant to exhaust gas ratio control routine. The third module 270 may adjust a flow rate of the exhaust gas 66 into the compressor section 152, which may affect the total fluid flow through the gas turbine engine 150 and, therefore, affect the loading of the SEGR gas turbine system 52. Accordingly, in such embodiments, the third module 270 may be considered to perform additional control using recycle flow.

The controller 118 further includes a fourth module 272, which is configured to control, among other things, a flow of the exhaust gas 42 into the EG supply system 78, which is configured to extract, treat, and compress exhaust gas 42 extracted from the combustor 160 (e.g., from a compressor discharge casing) into a product gas 274 used as a product stream for the hydrocarbon production system 12. The amount of the exhaust gas 42 extracted, the amount of compression of the exhaust gas 42, and so on, may affect the flow of fluids (e.g., hot combustion gases) into and out of the gas turbine engine 150, and may be used to adjust a pressure of the exhaust gas 66 within the exhaust recirculation path 110. Furthermore, the fourth module 272 may be configured to control, among other things, a pressure distribution of the exhaust gas 66 within the exhaust recirculation path 110, which is configured to pressurize the exhaust gas 66 into the compressor section 152. Indeed, in certain embodiments, the fourth module 272 may be considered to perform an exhaust gas pressure control routine, a load control routine (e.g., a purge flow load control routine), or a combination thereof, for example to supplement other load control techniques.

Again, the controller 118 may include the first, second, third, and fourth modules 262, 266, 270, 272, and these modules may operate independently of one another, or in concert. Furthermore, while each of the modules is depicted as being coupled to only certain flow control valves, transducers (e.g., sensors), and so forth, any and all permutations of connections are presently contemplated. In other words, each module may independently receive information from any one or a combination of the transducers described herein, and each module may independently control any one or a combination of the flow control actuators, guide vane actuators, drivers (e.g., motors), and so on, described herein. Indeed, the particular arrangements described below are intended to facilitate description of various embodiments, and are not intended to limit the present disclosure to any one arrangement.

As illustrated, the controller 118 having the first module 262 is communicatively coupled to an electrical generator 276, and in particular to a sensor 278 (e.g., a power meter) configured to provide electrical power output information to the controller 118. In certain embodiments, the first module 262 may use the power output information as a feedback to ensure that the SEGR gas turbine system 52 is providing an appropriate electrical output to the grid. The controller 118 is also depicted as being communicatively coupled to an exhaust extract flow meter 280 configured to determine a purge flow rate (e.g., a mass flow rate, volumetric flow rate) of the exhaust gas 42 flowing as extracted gas to the EG supply system 78. As discussed below, in certain embodiments, the first module 262 (or other module) of the controller 118 may utilize the purge flow rate to adjust a flow rate of the oxidant 68, which may adjust loading of the gas turbine engine 150.

Again, as a result of the data obtained from these sensors and data obtained from the grid (e.g., a target loading, such as a turbine speed/load reference signal), the controller 118 may adjust the flow of the oxidant 68 along the oxidant supply path 264. In the illustrated embodiment, the flow of the oxidant 68 along the oxidant supply path 264 is adjusted by adjusting flow through the MOC 188, flow through a booster oxidant compressor (BOC) 282, via one or more vents, or any combination thereof.

The controller 118 (e.g., the first module 262) may adjust the flow of the oxidant 68 through the MOC 188 by controlling a MOC actuator 284 capable of adjusting a position of MOC inlet guide vanes 286. The MOC inlet guide vanes 286 may be positionable to enable a flow of the oxidant 68 through the MOC 188 at a certain level. For example, the MOC inlet guide vanes (IGVs) 286 may be fully open, which may correspond to maximum oxidant flow through the MOC 188 and a correspondingly high loading on the SEGR gas turbine system 52. The loading may be high due at least to increased oxidant flow into the combustor 160, which results in increased combustion and corresponding increased amounts of combustion products. The increased heat output and pressure by the combustor 160 may result in increased work transfer to the turbine section 156, which increases the rotational rate of the shaft 176 and, therefore, increases the output of electrical power 74 by the electrical generator 276.

On the other hand, the MOC inlet guide vanes 286 may be partially opened, such as 10% open to enable only 10% of the maximum oxidant flow through the MOC 188, and a correspondingly lower loading on the SEGR gas turbine system 52. Indeed, the decreased flow of oxidant 68 into the combustor 160 decreases the heat output and pressure by the combustor 160 and, by extension, reduces electrical power output by the electrical generator 276. Therefore, the controller 118 may provide one or more control signals to the actuator 284 to adjust the position of the MOC IGVs 286 between fully closed (e.g., 0% oxidant flow) and fully open (e.g., 100% oxidant flow), such as between approximately 10% and 90% open, between approximately 20% and 80% open, and so on, to reach a desired compression, pressure, or flow rate for the oxidant 68.

A number of additional features may be disposed along the oxidant supply path 264 between the MOC 188 and the combustor 160 that may affect parameters (e.g., flow rate, temperature, pressure) of the oxidant 68 and eventual loading of the SEGR gas turbine system 52. As illustrated, the oxidant compressor section 186 includes a MOC intercooler 288, which is configured to cool the oxidant 68 between stages of compression (e.g., to enhance compression efficiency and not exceed maximum compressor operating temperatures), and the BOC 282, which is configured to boost a pressure of the oxidant 68 before delivery to the combustor 160.

After compression, the oxidant 68 may flow along the oxidant supply path 264 and through first and second intermediate oxidant paths 290, 292. The first intermediate oxidant path 290 leads to the MOC intercooler 288, which utilizes a flow of a coolant 294, which is controlled using a coolant flow control valve 296, to cool the oxidant 68 before delivery to the BOC 282. As depicted, the coolant flow control valve 296 is adjusted based on a level meter 298 configured to monitor or detect a level of the coolant in the MOC intercooler 288. The MOC intercooler 288 may be any type of cooling feature suitable for cooling the compressed oxidant 68, including but not limited to a spray intercooler, a feed water heater, a direct or indirect heat exchanger (e.g., a shell-and-tube heat exchanger), or the like. In certain of these configurations, the cooling medium may be adjusted (e.g., pressure, flow, temperature) to accomplish cooling of the compressed oxidant 68, in addition to or in lieu of adjustment of bypass flow as described below.

The second intermediate path 292 bypasses the MOC intercooler 288 and joins the cooled oxidant 68 exiting the MOC intercooler 288. The temperature of the resulting mixture, which flows to the BOC 282, may depend on the relative amounts flowing through the first and second intermediate paths 290, 292, and, in some embodiments, on the cooling by the cooling medium at the MOC intercooler 288. For example, an oxidant bypass flow control valve 300 disposed along the second intermediate path 292 may adjust the flow of the oxidant 68 into the second intermediate path 292 (and therefore the flow into the first intermediate path 290) based on a temperature of the oxidant 68 detected/measured by an oxidant temperature sensor 302 positioned downstream of the BOC 282. In embodiments where the oxidant temperature sensor 302 detects that the temperature of the oxidant 68 is too high (e.g., higher than a threshold value), the oxidant bypass flow control valve 300 may reduce or close flow along the second intermediate path 292 and increase cooling of the oxidant 68 by increasing the flow of the oxidant 68 through the MOC intercooler 288. The reverse operation (e.g., increasing the bypass flow) may occur in embodiments where the oxidant temperature sensor detects a temperature for the oxidant 68 that is lower than a threshold value.

Once the first and second intermediate paths 290, 292 join downstream of the MOC intercooler 288, the cooled oxidant 68 flows to the BOC 282. The flow of the oxidant 68 into the BOC 282 may be adjusted, as with the MOC IGVs 282, using BOC IGVs 304. In particular, the controller 118 (e.g., the first module 262) may send one or more control signals to a BOC IGV actuator 306, which adjusts a position of the BOC IGVs 304 to control the rate at which the oxidant 68 flows into the BOC 282. This, in turn, may also adjust the flow rate (e.g., the mass or volumetric flow rate) of the oxidant 68 to the combustor 160, which may affect the loading of the SEGR gas turbine system 52 as discussed above. Therefore, in one embodiment, the controller 118 (e.g., the first module 262) may receive information relating to a target load (e.g., due to a droop in the grid speed), and may send one or more control signals to the BOC IGV actuator 306 to adjust the position of the BOC IGVs 304 to adjust oxidant flow (e.g., between fully open and fully closed, and all positions therebetween).

While adjusting the position of the BOC IGVs 304 may have a smaller effect on the oxidant flow rate compared to the MOC IGVs 286 due to their difference in size, it may be desirable to maintain some headroom in the MOC IGVs 286 to enable rapid responses. For example, rather than keeping the MOC IGVs 286 in a fully open position and utilizing the BOC IGVs 304 to adjust oxidant flow to meet load demand, it may be desirable to instead maintain the MOC IGVs 286 at less than their maximum open position (e.g., between 60% and 90% open), while maintaining the BOC IGVs 304 at an open position as well (e.g., between 60% and 90% open). This enables the controller 118 to adjust the MOC IGVs 286 to enable a relatively rapid change in the flow rate of the oxidant 68, since the same percentage change in the MOC IGVs 286 compared to the BOC IGVs 304 will have a greater affect on the overall oxidant flow rate. Accordingly, the MOC IGVs 286 and the BOC IGVs 304 may be adjusted independently or in concert with one another. That is, the controller 118, in performing oxidant flow-based load control, may adjust the flow through the MOC 188 and/or the BOC 282.

In addition to, or in lieu of, adjusting the flow of the oxidant 68 using the MOC IGVs 286 and the BOC IGVs 304, the controller 118 (e.g., the first module 262) may adjust a speed of the BOC 282. In particular, the controller 118 may adjust a speed of a BOC driver 308 drivingly coupled to the BOC 282 via a BOC shaft 310. The BOC driver 308 may include, but is not limited to, a steam turbine or an electric motor. Therefore, the speed of the BOC driver 308 may be adjusted by adjusting a flow of steam to the BOC driver 308 (e.g., in embodiments where the driver 308 is a steam turbine), or by adjusting an amount of electrical power provided to the BOC driver 308 (e.g., in embodiments where the driver 308 is an electric motor).

The speed of the BOC 282 may be measured at the BOC shaft 310 using a rotational speed system 312, which may be a smart device (e.g., a processor-based device) that measures the speed of the BOC shaft 310 and provides one or more control signals to the BOC driver 308 (e.g., to a flow control valve controlling steam flow or a circuit control controlling electrical power flow). As depicted, the speed of the driver 308 may also be adjusted based on a sensed pressure of the oxidant 68 (e.g., using a first oxidant pressure sensor 314) upstream of the BOC 282. In this way, the speed of the driver 308 is adjusted according to a predetermined pressure increase across the MOC 188. While depicted as being positioned upstream of the MOC intercooler 288, the first oxidant pressure sensor 314 may be positioned at any point along the oxidant supply path 264 (e.g., any point upstream of the MOC intercooler 288). The illustrated oxidant compression system 186 also includes a second oxidant pressure sensor 316 configured to sense a pressure of the oxidant 68 at a position downstream of the BOC 282. In this manner, the pressure increase across the BOC 282 or, where applicable, across the MOC intercooler 288 and the BOC 282, may be determined using the first and second pressure sensors 314, 316. After the BOC 282 boosts the pressure of the oxidant 68, the oxidant 68 may be provided to the combustor 160.

Rather than progressing through the oxidant supply path 264 in the manner discussed above, a portion of the oxidant 68 may, instead, be vented. In particular, after compression at the MOC 188, a portion of the oxidant 68 may flow through a first oxidant vent path 318, the rate and amount of which is controlled using a first oxidant vent control valve 320, and out of a first oxidant vent 322. The first oxidant vent control valve 320 may be adjusted based on one or more control signals provided by the controller 118 (e.g., the first module 262), and may be controlled to adjust the loading of the SEGR gas turbine system 52. By way of non-limiting example, the loading of the SEGR gas turbine system 52 may be controlled by flowing a portion of the oxidant 68 out of the first oxidant vent 322 during startup of the system 52.

Additionally or alternatively, compressed oxidant 68 flowing from the BOC 282 may be vented. In particular, as illustrated, the oxidant 68 may flow through a second oxidant vent path 324, the rate and amount of which is controlled using a second oxidant vent control valve 326, and out of a second oxidant vent 328. Flow of the oxidant 68 out of the second oxidant vent 328 may be controlled to achieve a target pressure for the oxidant 68 before provision to the combustor 160. Accordingly, as depicted, the second oxidant vent control valve 326 may be controlled, at least in part, based upon feedback signals from the second oxidant pressure sensor 316 disposed downstream of the BOC 282.

In addition to, or in lieu of, venting according to the embodiments discussed above, the oxidant 68 flowing out of the MOC 188 may be recycled to adjust an amount of the oxidant 68 flowing through the oxidant supply path 264. For example, as illustrated, after compression at the MOC 188, the oxidant 68 may flow along an oxidant recycle path 330, which returns the compressed oxidant 68 to the oxidant supply path 264 upstream of the MOC 188. The flow of the oxidant 68 along the oxidant recycle path 330 may be controlled at least partially using a recycle fuel flow control valve 332, which may be operated by the controller 118, automatically based on sensed pressures, flow rates, etc., by a human operator, or any combination thereof.

As set forth above, the controller 118 (e.g., the second module 266) may adjust a flow of the fuel 70 in response to changes in the flow of the oxidant 68 (e.g., from load control). In particular, the controller 118 may adjust a flow of the fuel 70 along the fuel supply path 268, which may include one or more conduits configured to flow the fuel 70 to the combustor 160. For example, as depicted, the controller 118 is communicatively coupled to a fuel flow control valve 334, and may provide one or more control signals to the fuel flow control valve 334 to stop, start, or otherwise adjust the flow of the fuel 70 to the combustor 160.

The adjustments to the fuel flow rate may be based on a number of factors, including the flow rate of the oxidant 68. Accordingly, the controller 118 may be coupled to an oxidant flow meter 336 configured to measure/monitor a flow rate of the oxidant 68 to the combustor 160. As illustrated, the oxidant flow meter 336 is positioned between the BOC 282 and the combustor 160. However, the oxidant flow meter 336 may be positioned anywhere along the oxidant supply path 264, such as between the MOC 188 and the BOC 282, between the MOC 188 and the MOC intercooler 288, or between the MOC intercooler 288 and the BOC 282. Indeed, an oxidant flow meter may be positioned at any one or a combination of these locations. By way of non-limiting example, once the oxidant flow rate is established, for example based on a target loading for the SEGR gas turbine system 52 (e.g., due to a grid speed change), the fuel flow may be adjusted to establish combustion within the combustor 160 at a target equivalence ratio ($\phi$), such as between approximately 0.95 and 1.05, or 1.0 plus or minus 0.1, 0.2, 0.3, 0.4, 0.5, or more.

The fuel flow rate may be monitored using a fuel flow meter 338, which may be communicatively coupled to the controller 118. The fuel flow meter 338 may therefore provide feedback indicative of the fuel flow rate to enable the controller 118 to account for variability in the supply of the fuel 70 when the control signals are generated for the fuel flow control valve 336.

In certain embodiments, the controller 118 (e.g., the second module 266) may utilize additional parameters in determining an appropriate flow rate for the fuel 70. For example, as illustrated, the controller 118 is communicatively coupled to a series of sensors that provide information relating to the composition of the exhaust gas 60 that is discharged from the turbine section 156 and/or the composition of the product gas 274 used for delivery to the hydrocarbon production system. The information may be provided by an exhaust $\phi$ sensor 340 positioned at the exit of the turbine section 156 along the exhaust recirculation path 110, a temperature sensor 342 configured to monitor a temperature change across a CO catalyst 344 of the HRSG 56, and/or an exhaust oxygen sensor 346 positioned along the exhaust recirculation path 110.

The exhaust $\phi$ sensor 340 may make direct or indirect measurements of $\phi$ in the exhaust gas 60 discharged from the turbine section 156, and may serve as feedback for the control of the fuel flow rate by the controller 118 (e.g., the second module 266). The exhaust $\phi$ sensor 340, in certain embodiments, may directly measure $\phi$, or may measure the relative abundance of components in the exhaust 60 (e.g., fuel, oxygen) to determine $\phi$, which enables the controller 118 to determine whether the combustion in the combustor 160 is stoichiometric, fuel-lean, or fuel-rich. For example, in embodiments where the target $\phi$ is 1, when $\phi$ is greater than 1, indicating a fuel-rich combustion within the combustor 160, the controller 118 may reduce the flow rate of the fuel 70. In embodiments where $\phi$ is less than 1, indicating a fuel-lean combustion within the combustor 160, the controller 118 may increase the flow rate of the fuel 70.

The exhaust temperature sensor 342 positioned to detect a temperature change across the CO catalyst 344 may provide a relative indication of combustion products generated within the combustor 160. For example, the CO catalyst 344 may convert CO or other unreacted fuel, or unreacted oxidant into another material (e.g., $CO_2$) via an exothermic chemical reaction, an increase in temperature across the CO catalyst 344, as detected by the exhaust temperature sensor 342, indicates the presence of unreacted fuel and/or oxidant in the exhaust gas 60—an indicator of incomplete combustion within the combustor 160. Indeed, in embodiments where the exhaust temperature sensor 342 provides an indication to the controller 118 of a non-stoichiometric combustion, the controller 118 (e.g., the second module 266) may decrease the fuel flow rate (and, in some embodiments, oxidant flow rate) to achieve a target equivalence ratio within the combustor (e.g., for a target $\phi$ of 1).

The exhaust oxygen sensor 346 provides information to the controller 118 that is complementary to the information provided by the exhaust temperature sensor 342. For example, the exhaust temperature sensor 342 may provide information relating to the levels of unburnt fuel 70 and/or excess oxidant 68 in the exhaust 60, and the exhaust oxygen sensor 346 provides information relating to the oxygen content within the exhaust 60. Therefore, in embodiments where the exhaust oxygen sensor 346 senses oxygen in the exhaust gas 60, which is indicative of a fuel-lean combustion within the combustor 160, the controller 118 (e.g., the second module 266) may increase the flow rate of the fuel 70. On the other hand, in embodiments where the exhaust oxygen sensor 346 does not sense oxygen in the exhaust gas 60, which is indicative of stoichiometric combustion or a fuel-rich combustion, the controller 118 (e.g., the second module 266) may also utilize the exhaust temperature information to determine whether the flow rate of the fuel 70 might be changed to achieve a target equivalence ratio (e.g., if the temperature difference across the CO catalyst 344 indicates the presence of unreacted materials).

The controller 118 (e.g., the second module 266) may also adjust the flow of the fuel 70 along the fuel supply path 268 as a result of compositional information related to the exhaust gas 42 that flows into the exhaust gas supply system 78 along a purge flow path 347. For example, the exhaust gas 42 may flow into a product cooler 348 configured to transfer heat from the exhaust gas 42 to a cooling medium, such as a feed water. In certain embodiments, the product cooler 348 may include an indirect cooler, such as a shell-and-tube heat exchanger, a HRSG, or the like. In other embodiments, the product cooler 348 may be a direct contact cooler, such as a spray cooler.

The product cooler 348, in a similar manner to the HRSG 56, includes a CO catalyst 350 configured to convert CO or other unreacted fuel, or oxidant, within the exhaust gas 42 into another gaseous material (e.g., $CO_2$). Accordingly, the temperature change across the CO catalyst 350 may provide compositional information about the exhaust gas 42 extracted from the combustor 160 (e.g., exhaust gas not used as a combustion diluent). Indeed, the controller 118 (e.g., the second module 266) receives temperature information from a temperature sensor 352, which detects/monitors the temperature change of the exhaust gas 42 across the CO catalyst 350. In embodiments where the temperature rises, indicating the presence of uncomubusted materials in the exhaust gas 42 (e.g., due to fuel-rich or fuel-lean combustion in the combustor 160), the controller 118 (e.g., the second module 266) may correlate the temperature change to a particular response in the flow of the fuel 70, such as a decrease in the fuel flow rate (e.g., when combined with other inputs relating to compositional information, such as from an oxygen sensor or other similar type of sensor).

The controller 118 may also receive information related to the oxygen content of the exhaust gas 42 within the exhaust gas supply system 78. For example, as depicted, the exhaust gas 42 flows through the purge flow path 347, through the product cooler 348, and to a product compressor 354, which compresses the exhaust gas 42 into the product gas 274. A product gas oxygen sensor 356 detects/monitors the amount of oxygen in the product gas 274, and provides the oxygen-related information to the controller 118 (e.g., the second module 266). As discussed above with respect to the temperature sensor 342 and the exhaust oxygen sensor 346, the product gas oxygen sensor 356 may be complementary to the temperature sensor 352 coupled to the product cooler 348, and the controller 118 (e.g., the second module 266) may adjust a flow of the fuel 70 as a result of information obtained from either or both.

The load control system 260 is not limited to load control based on the flow of the oxidant 68 to the combustor 260. Rather, while not intending to limit the scope of the embodiments relating to load control based on oxidant flow discussed above and in further detail below, the load control system 260 may be configured to load and unload the SEGR gas turbine system 52 using (e.g., in addition to the flow of the oxidant 68) the flow of the exhaust gas 60 through the exhaust recirculation path 110 as a primary and/or secondary load control parameter (e.g., as a recycle loop flow control). Alternatively, when the oxidant flow is controlled as the primary load control parameter (and, in certain embodiments, a secondary load control parameter), the controller 118 may adjust the flow of the exhaust gas 60 through the exhaust recirculation path 110 for temperature adjustment, exhaust to diluent ratio adjustment, and so forth.

By way of non-limiting example, the controller 118 (e.g., the third module 270) may control or at least partially affect the loading and unloading of the SEGR gas turbine system 52 by adjusting the flow of the exhaust gas 60 along the recirculation path 110. The flow of the exhaust gas 60 may affect the temperatures within the combustor 160, for example by controlling the temperature that is reached based on the combustion within the combustor via a diluent effect. As discussed above, the turbine section 156 drives the shaft 176 at a speed that is at least partially dependent upon the heat release by the combustor 160. Therefore, in controlling the firing temperature in the combustor 160 in this manner, the electrical power output by the electrical generator 276 may be considered to be at least partially controlled or affected by the exhaust flow through the recirculation path 110.

The temperatures of the turbine 156 are a result of a complex relationship between the relative amounts of fuel 70, the oxidant 68, and the exhaust gas diluent in the combustor 160, as well as their individual temperatures and pressures upon delivery to the combustion chamber. In one embodiment, the flow of the exhaust gas 66 into the combustor 160, for example, may be controlled by the controller 118 (e.g., the third module 270) by adjusting the operation of a recycle blower 358 positioned along the exhaust recirculation path 110, by adjusting the operation of the compressor section 152 (e.g., a recycle or exhaust gas compressor), or a combination thereof. For example, the vane angle of the recycle blower 358 may be adjusted using a recycle blower actuator 360, where the vane angle adjusts the flow rate of the exhaust gas 60 along the recirculation path 110. The vane angle may be defined as the angle of vanes 362 of the recycle blower 358 positioned relative to a flow direction of the exhaust gas 60 within the exhaust recirculation path 110. Accordingly, the vane angle, when increased, may be positioned so as to enable the blower 358 to have an enhanced effect on the exhaust gas flow, while when the vane angle is decreased, the effect of the blower 358 on the exhaust gas flow is diminished. The vane angle of the recycle blower 358 may be varied by the controller 118 using the actuator 360 between any suitable angles, such as between 0° and 90°, between 10° and 80°, between 20° and 70°, and so on.

When suitably positioned, the vanes 362 of the recycle blower 358 may be used to adjust the pressure of the exhaust gas 60 within the exhaust recirculation path 110 by, for example, between approximately 1 psi and 10 psi (e.g., between approximately 6.9 kilo Pascals (kPa) and 69 kPa), between approximately 1 psi and 5 psi (e.g., between approximately 6.9 kilo kPa and 34.5 kPa), or between approximately 1 psi and 3 psi (e.g., between approximately 6.9 kilo kPa and 20.7 kPa). Adjusting the pressure in this manner increases/decreases the flow rate of the exhaust gas 60 to the compressor section 152, enabling enhanced or reduced flow of exhaust gas diluent into the combustor 160, which, in some embodiments, may reduce or increase the firing temperature within the combustor 160 relative to some other operational state.

In one embodiment, in addition to, or in lieu of, adjusting a vane angle of the recycle blower 358, the controller 118 (e.g., the third module 270) may adjust recycle compressor IGVs 364 of the compressor section 152 (e.g., the recycle/exhaust gas compressor). As depicted, the controller 118 (e.g., the third module 270) may send one or more control signals to a recycle compressor IGV actuator 366, which is configured to adjust a position of the recycle compressor IGVs 364. The position of the recycle compressor IGVs 364 may be adjusted by the controller 118 between fully open, which may correspond to maximum exhaust flow through the compressor section 152 and fully closed, which may correspond to minimum exhaust flow (e.g., no exhaust flow) through the compressor section 152. Indeed, the controller 118 may provide one or more control signals to the actuator 366 to adjust the position of the recycle compressor IGVs 364 between fully closed (e.g., 0% exhaust flow) and fully open (e.g., 100% exhaust flow), such as between approximately 10% and 90% open, between approximately 20% and 80% open, and so on, to reach a desired compression, pressure, or flow rate for the exhaust gas 66.

As set forth above, the present disclosure is intended to encompass any loading of the SEGR gas turbine system 52 that is controlled or at least partially affected using the recycle flow (the flow of the exhaust gas 66 to the combustor 160) as at least a component parameter (e.g., a secondary load control parameter). As noted above, the controller 118 (e.g., the third module 270) may adjust a flow of the oxidant 68 through the MOC 188 by sending one or more control signals to the MOC IGV actuator 284 to open, close, or otherwise adjust the MOC IGVs 286 to a position suitable for attaining an appropriate oxidant flow to the combustor 160. In other words, in one embodiment, the third module 270 of the controller 118 may, in addition to adjusting a flow of the exhaust gas 66 into the combustor 160, control a flow of the oxidant 68 into the combustor 160 to control the flow of the oxidant 68, which in combination with the fuel 70 controlled by controller 118 (e.g., the second module 266), may affect the heat release by the combustor 160. The flow of the exhaust gas may control the manner in which this heat release affects the temperatures within the combustor 160 via the diluent effect.

Indeed, in certain embodiments, the third module 270 of the controller 118 may be configured to perform exhaust temperature control to offset the heat release by the combustor 160 after primary and/or secondary load control is performed by controlling the oxidant flow, or other flows. For example, a temperature sensor 368 positioned along the exhaust recirculation path 110 (e.g., at an outlet of the turbine section 156) may determine/monitor a temperature of the exhaust gas 60 exiting the turbine section 156. The controller 118 may adjust the vane angle of the recycle blower 358, the position of the recycle compressor IGVs 364, or a combination thereof, to adjust the temperature of the exhaust gas 60 exiting the turbine section 156 to a target temperature. For example, a greater amount of exhaust gas diluent within the combustor 160 may decrease temperatures in turbine 156 (e.g., due to an increased cooling flow to offset the heat release in combustor 160), while a reduced amount of exhaust gas diluent within the combustor 160 may increase temperatures in turbine 156 (e.g., due to a decreased cooling flow to offset the heat release in combustor 160).

The exhaust recirculation path 110, as illustrated, may also include cooling features configured to adjust a temperature of the exhaust gas 60 within the exhaust recirculation path to produce the exhaust gas 66 provided to the compressor section 152. In the illustrated embodiment, the cooling features include an exhaust cooler 370, such as a direct contact cooler (e.g., a spray intercooler). The exhaust cooler 370, as depicted, uses a coolant flow 372 (e.g., boiler feed water) to cool the exhaust gas 60, where the amount of coolant flow 372 provided to the exhaust cooler 370 controls the temperature of the exhaust gas 66 provided to the compressor section 152. The coolant flow 372 may produce a heated flow 374 after heat transfer from the exhaust gas 60, and may be used as a cooling or other process fluid for another feature of the SEGR gas turbine system 52.

The amount of the coolant flow 372 provided to the exhaust cooler 370 may be controlled using an exhaust coolant flow control valve 376, which is configured to stop, start, or otherwise adjust the flow rate of the coolant flow 372 to the exhaust cooler 370. The exhaust coolant flow control valve 376 may be adjusted based on one or more control signals provided from the controller 118, and/or one or more control signals generated by a temperature sensor 378 positioned downstream of the exhaust cooler 370. For example, the temperature sensor 378 may be communicatively coupled to the controller 118 and/or the exhaust coolant flow control valve 376, and may provide data indicative of the temperature of the exhaust gas 66 to either or both. In certain embodiments, the exhaust coolant flow control valve 376 may be a smart device (e.g., a processor-based device) capable of adjusting its position in response to the data generated by the temperature sensor 378.

In controlling the loading and unloading of the SEGR gas turbine system 52, the controller 118 (e.g., the fourth module 272) may also adjust a flow of the exhaust gas 42 along the purge flow path 347, which may affect the pressure of the exhaust gas 60 along the exhaust recirculation path 110. Controlling the pressure of the exhaust gas 60 along the exhaust recirculation path 110, and the flow of the exhaust gas 42 along the purge flow path 347, may at least partially control the amount of exhaust gas 66 provided to the combustor 160. As noted above, such control may adjust the temperatures in turbine 156 within limits during loading and unloading of the SEGR gas turbine system 52.

The controller 118 (e.g., the fourth module 272) may adjust various flows along the purge flow path 347 (e.g., within the exhaust gas supply system 78) in response to, for example, a flow rate of the oxidant 68 to the combustor 160, a target load reference (e.g., a turbine speed load reference signal), and various pressures of exhaust gas within the SEGR gas turbine system 52. The flow rates of the oxidant 68, the fuel 70, and so forth, may be provided to the controller 118 as described above. In addition, the controller 118 (e.g., the fourth module 272) may receive pressure data relating to a pressure of the exhaust gas 60 at various points along the exhaust recirculation loop 110, which extends from the exit of the turbine section 156 to the compressor section 152 (e.g., an outlet of the recycle compressor).

In the illustrated embodiment, for example, the controller 118 (e.g. the fourth module 272) receives a first pressure signal from a first exhaust pressure sensor 380 positioned along the recirculation path 110 between the HRSG 56 and the recycle blower 358, though any position along the path 110 is presently contemplated. Accordingly, in the illustrated embodiment, the first pressure signal relates to a pressure of the exhaust gas 60 before being further motivated by the recycle blower 358. The controller 118 (e.g., the fourth module 272) also receives a second pressure signal from a second exhaust pressure sensor 382 positioned along the exhaust recirculation path 110 downstream from the exhaust cooler 370. Accordingly, the second pressure signal may provide a pressure of the exhaust gas 66 after motivation by the blower 358 and cooling in the exhaust gas cooler 370. As also illustrated, the controller 118 (e.g., the fourth module 272) receives a third pressure signal from a third exhaust pressure sensor 384 positioned at an exit of the compressor section 152. Accordingly, the third pressure signal may be indicative of a pressure of the exhaust gas diluent provided to the combustor 160.

Using any one or a combination of such pressure indications, the controller 118 (e.g., the fourth module 272) may adjust the flow of the exhaust gas 42 along the purge flow path 347 to obtain a desired flow of the product gas 274 while also meeting load demand. In particular, the flows controlled by the controller 118 (e.g., the fourth module 272) to control purge flow and recycle loop pressure control (e.g., pressure control along the exhaust recirculation path 110) may include a flow of the exhaust gas 42 into a purge vent flow path 386. The purge vent flow path 386 includes a vent control valve 388, which adjusts the amount of the exhaust gas 42 vented out of the SEGR gas turbine system 52 via an exhaust vent 390. The amount of the exhaust gas 42 that is vented may, in certain embodiments, be used to adjust the amount of exhaust gas 42 that is extracted from the combustor 160 and, therefore, the mass flow through turbine 156 and associated loading of the system 52.

Additionally or alternatively, the controller 118 may adjust a purge flow control valve 392 positioned along the purge flow path 347, which may adjust the amount of the exhaust gas 42 provided to the EG supply system 78. In a similar manner as described above with respect to the vent path 386, the amount of the exhaust gas 42 that flows through the purge flow control valve 392 may affect the amount of the exhaust gas that is extracted from the combustor 160, which can affect mass flow through turbine 156 and associated temperatures therein. Further, the controller 118 (e.g., the fourth module 272) may coordinate the operation of the vent control valve 388 and the purge flow control valve 392 to extract an amount of the exhaust gas 66 from the combustor 160 for use as the product gas 274, in response to loading of the SEGR gas turbine system 52, and/or to adjust a pressure of the exhaust gas 60 in the exhaust recirculation path 110.

Another parameter that the controller 118 may adjust to control purge flow is a speed of the product compressor 354. In particular, the controller 118 (e.g., the fourth module 272) may, in response to load demand or in response to the adjustment of other parameters (e.g., oxidant flow) in response to load demand, may adjust a speed of a product gas compressor driver 394, which may be a steam turbine or electric motor. The speed of the product compressor 354 and its driver 394, measured based on a speed of rotation of a product gas compressor shaft 396 drivingly coupling the driver 394 to the compressor 354, may be measured using a rotational speed system 398. The rotational speed system 398 may be a smart device (e.g., a processor-based device) that measures the speed of the product compressor shaft 396, and may also provide one or more control signals to the product gas compressor driver 394 (e.g., to a flow control valve controlling steam flow or a circuit control controlling electrical power flow).

As depicted, the speed of the driver 394 may also be adjusted based on control signals provided by the controller 118 (e.g., the fourth module 272). In this way, the speed of the driver 394 is adjusted according to one or more control routines performed by the controller 118, including load control routines, exhaust recycle loop pressure control routines, and so forth.

The flow of the exhaust gas 42 through the product compressor 354 may also be controlled by adjusting a position of product gas compressor IGVs 400. In particular, the controller 118 (e.g., the fourth module 272) may send one or more control signals to a product gas compressor IGV actuator 402, which is configured to adjust the position of the product gas compressor IGVs 400 to adjust the flow of the exhaust gas 42 therethrough. Indeed, the actuator 402 may adjust the position of the IGVs 400 between fully open (e.g., full exhaust flow through the product gas compressor 354) and fully closed (e.g., minimal or no exhaust flow through the product gas compressor 354), including all positions therebetween (e.g., between 10% and 90% open, between 20% and 80% open, between 30% and 70% open). In certain embodiments, adjusting the flow of the exhaust gas 42 through the product gas compressor 354 may not only control the amount of the product gas 274 available for use in the hydrocarbon production system 12, but may also adjust the amount of exhaust gas 42 extracted from the combustor 160 without use as an exhaust gas diluent (e.g., from a compressor discharge casing).

The EG supply system 78 also includes a product gas flow control valve 404, which may be controlled by the controller 118 to adjust a flow rate of the product gas 404 to the hydrocarbon production system 12 or other downstream process. In the event that the amount of exhaust gas 42 extracted from the combustor 160 is greater than the amount of product gas 274 desired for downstream use, or if the downstream process is out of service, all or a portion of the product gas 274 may be provided to a product vent flow path 406 configured to vent the product gas 274. In particular, the amount of the product gas 274 flowed through the vent path 406 may be controlled using a product gas vent control valve 408 positioned along the product gas vent flow path 406. The control valve 408 may stop, start, or otherwise adjust an amount of the product gas 274 flowed out of the SEGR gas turbine system 52 via a product gas vent 410. Indeed, the vent 410 may provide an additional outlet for exhaust pressure control in embodiments where it may be desirable to extract larger amounts of the exhaust gas 42 than may be used within the SEGR gas turbine system 52, in various downstream processes, and so on, for example to control the loading on the SEGR gas turbine system 52.

In addition to, or in lieu of flowing the product gas 274 to the hydrocarbon production system 12, the product gas 274 may flow through a product gas recirculation pathway 412. The product gas recirculation pathway 412 routes the product gas 274 back to the purge flow path 374. The amount of recirculated product gas 274 is at least partially controlled using a product gas recirculation control valve 414, which may be operator-controlled or controlled by the controller 118. The product gas recirculation path 412, as depicted, routes the product gas 274 back to the purge flow path 347 to a point upstream of the product cooler 348, though any point along the purge flow path 347 is presently contemplated.

The controller 118 (e.g., the fourth module 272) may also control the amount of extracted exhaust gas 42 that is recycled back to the exhaust recirculation path 110 to control the pressure of the exhaust gas 60 in the path 110, which may be adjusted in response to loading of the SEGR gas turbine system 52. For example, as depicted, a product gas recycle path 416 extending between the purge flow path 347 and the exhaust recirculation path 110 may flow the exhaust gas 42 to the path 110. In the illustrated embodiment, the recycle path 416 flows the exhaust gas 42 to a point upstream of the recycle blower 358, though any delivery point is presently contemplated.

The amount of the exhaust gas 42 flowed along the recycle path 416 may be controlled using a recycle flow control valve 418 positioned along the recycle path 416, where the valve 418 is positioned according to one or more control signals provided by the controller 118 (e.g., the fourth module 272), or by a user, or both. The controller 118, for example, may adjust the position of the flow control valve 418 to stop, start, or otherwise adjust the flow of the exhaust gas 42 to the exhaust recirculation path 110 to obtain a target pressure within the path 110, as measured at any one or a combination of the first, second, and/or third exhaust pressure sensors 380, 382, 384. Again controlling the pressure of the exhaust gas 60 within the exhaust recirculation path 110 may adjust the amount of exhaust gas diluent used for combustion within the combustor 160, which affects turbine 156 temperatures during loading and unloading of the SEGR gas turbine system 52. Controlling the pressure of the exhaust gas 60 within the exhaust recirculation path 110 also ensures the components are maintained within their upper and lower pressure limits.

The controller 118 (e.g., the fourth module 272) may also adjust the blower vane angle 360 to control the pressure rise from sensor 380 to sensor 382, or to limit the pressure sensed by sensor 382 to within acceptable limits for the SEGR gas turbine system 52. Such limits may include shaft torque and/or aerodynamic limits in the compressor section 152 or the turbine section 156.

Figure 6:
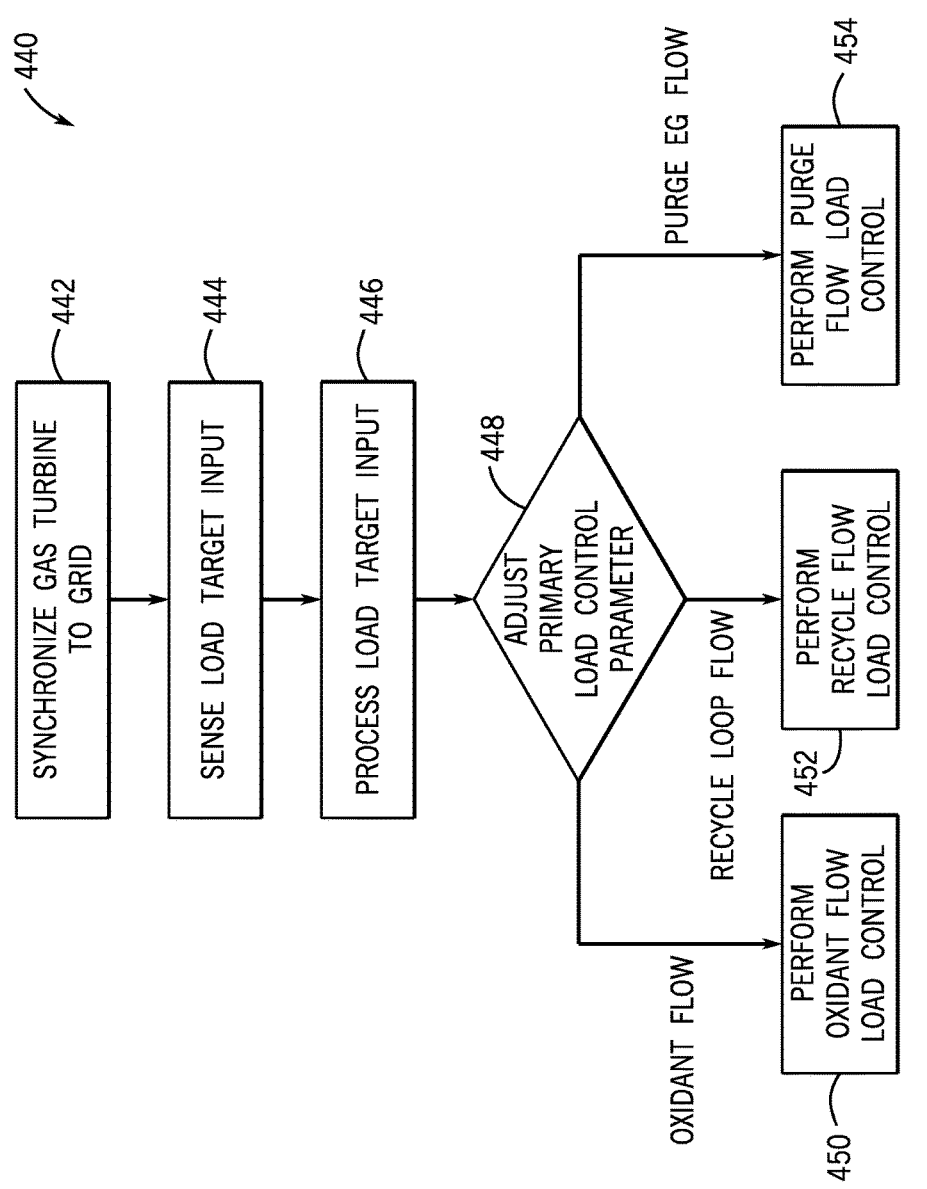
FIG. 6 is a flow chart of an embodiment of a control process for load control using the control system of FIG. 5.

As noted above, the SEGR gas turbine system 52 may operate to provide electrical power 74 to an electrical grid, and may be controlled so as to respond to changes in load demand. For example, the SEGR gas turbine system 52 may increase its output of electrical energy 74 by increasing the load on the gas turbine engine 150 in response to droops in grid speed or in response to increased load demand. One embodiment of a method 440 for controlling the operation of the SEGR gas turbine system 52 in response to changes in demand is depicted in FIG. 6.

As illustrated, the method 440 includes first synchronizing (block 442) the SEGR gas turbine system 52 to the power grid, which, as noted above, may be an electrical power grid of a municipality or the like. Synchronizing the SEGR gas turbine system 52 may include all or a portion of the acts set forth above with respect to method 220 of FIG. 4, including initiating startup according to block 222, and transitioning to normal operation according to blocks 222-240. In certain embodiments, during startup of the SEGR gas turbine system 52, the system 52 may be under full speed no load conditions, in which the system 52 provides no output of the electrical energy 74, a turbine speed/load reference of the system 52 may be at 100%, and the MOC IGVs 286 may be proportionally adjusted to hold the speed of the turbine section 156. Once the SEGR gas turbine system 52 is operational, a breaker of the electrical generator 276 may be closed, which enables the generator 276 to provide electrical power 74 to the grid, and also enables the SEGR gas turbine system 52 to receive load commands.

Indeed, once synchronized according to block 442, the method 440 progresses to sensing a load target input, such as a load demand from the grid (block 444). The load demand may be a turbine speed/load reference in which the megawatt command is superimposed onto the speed command defined based on a predetermined droop setting, which sets the output of the SEGR gas turbine system 52 based on a percentage droop in the grid speed. By way of non-limiting example, the SEGR gas turbine system 52 may be configured to provide a percentage of its power to the grid depending on a percentage droop in grid speed. In one embodiment, the SEGR gas turbine system 52 may be commissioned to contribute 100% of its rated power if the grid speed droops by a certain percentage.

Once the target load input is received according to block 444, the target load may be processed (block 446). For example, the controller 118 may determine appropriate adjustments to the operation of the SEGR gas turbine system 52, for example based on a grid frequency filter that is applied to speed feedback to limit the response of the gas turbine engine 150 to within its limits. Once an appropriate speed or other operational parameter for the SEGR gas turbine engine 52 is determined, the primary and/or secondary load control parameters of the system 52 may be adjusted (block 448) according to a number of different processes.

In accordance with the present disclosure, the flow of the oxidant 68 along the oxidant supply path 264 may be the primary load control parameter (block 450). In such an embodiment, the controller 118 may adjust various oxidant flow parameters, including the flow of the oxidant 68 through the MOC 188, the flow of the oxidant 68 through the BOC 282, or a combination thereof, and to the combustor 160. One embodiment of the oxidant flow-based load control method 450 is discussed in detail below with respect to FIG. 7.

While oxidant-based load control may generally be the primary load control parameter, the flow of the exhaust gas 42 through the exhaust recirculation loop 110 may also be adjusted (block 452). In such an embodiment, the controller 118 may adjust the operation of various features of the EG processing system 54, such as the recycle blower 358 and/or the compressor section 152, to control the flow of the exhaust gas 66 to the combustor 160. Again, this may control the temperatures within the turbine section 156 to affect or in response to loading on the system 52. One embodiment of the recycle flow-based load control 42 is discussed in detail below with respect to FIG. 8.

In yet another embodiment, the flow of the exhaust gas 42 through the purge flow path 347 may also be adjusted (block 454). In such an embodiment, the controller 118 may adjust the operation of various features of the EG supply system 78, such as a product gas compressor 354, to control the flow of the exhaust gas 66 to the combustor 160. Again, this may control the temperatures within the turbine section 156 to affect or in response to loading on the system 52. One embodiment of the recycle flow-based load control 454 is discussed in detail below with respect to FIG. 9.

Figure 7:
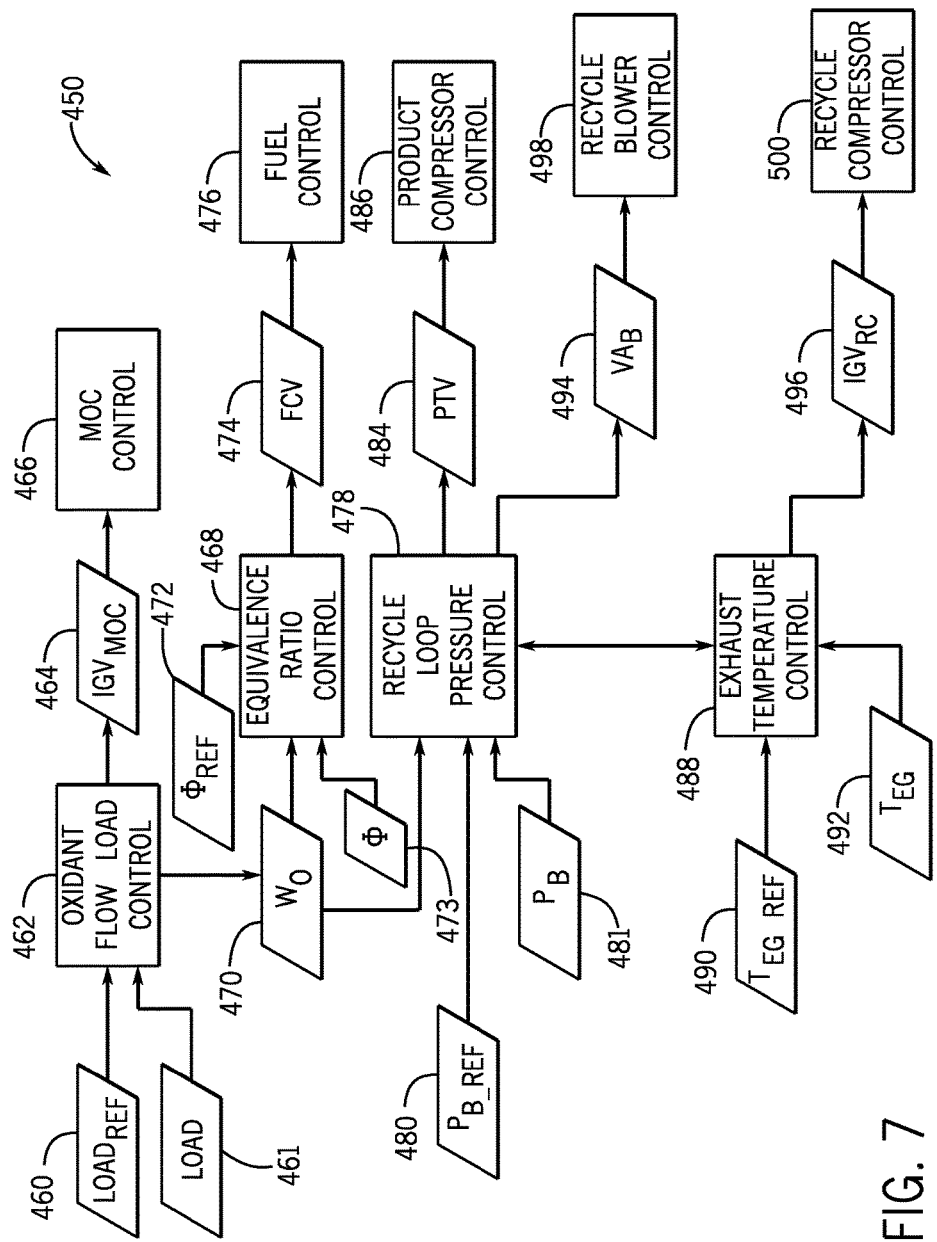
FIG. 7 is a flow chart of an embodiment of a control process for loading and unloading the gas turbine system using the control system of FIG. 5.

Moving now to FIG. 7, as noted above, an embodiment of the method 450 for performing oxidant flow-based load control is depicted. It should be noted that the methods described herein may correspond to one or more sets of instructions, algorithms, or routines that may be performed by the controller 118 using any one or a combination of the first, second, third, and fourth modules 262, 266, 270, 272. Indeed, the one or more sets of instructions may be executed by one or more processing devices to perform the routines described herein.

The method 450, as illustrated, includes the receipt or internal generation of a load reference 460, which may be a turbine speed/load reference signal, or may be used to generate the turbine speed/load reference signal. Based on the load reference 460, denoted as $LOAD_{REF}$, as well as an input as to the operational load 461 (e.g., the current load at which the system is operating) the method 450 progresses to performing oxidant flow load control 462, which may determine an appropriate oxidant flow to the combustor 160 based on the load inputs 460, 461. As discussed above, the oxidant flow may affect the amount of combustion within the combustor 160, which affects overall flow and pressure out of the combustor and also affects heat release by the combustor 160. The oxidant flow load control 462 also may determine appropriate positions for the MOC IGVs 286, the BOC IGVs 304, the speed of the BOC 282, and other oxidant flow-related parameters suitable for attaining the target oxidant flow rate, such as MOC vent valves (e.g., MOV vent vale 320 of FIG. 5). As illustrated, the oxidant flow load control 464 may output a reference 464 for the MOC IGVs 286, denoted as $IGV_{MOC}$, which may correspond to a position of the MOC IGVs for attaining the target oxidant flow rate. In certain embodiments, similar references may also be generated for the BOC IGVs 304 and/or the speed of the BOC 282, as well as the MOC vent valve 320.

The $IVG_{MOC}$ reference 464 may be provided to a MOC control 466, which may correspond to a control module and/or one or more sets of instructions stored on the controller 118 for generating output signals used to control the MOC 188. For example, the MOC control 466 may generate one or more control signals that are provided to the actuator 284 for controlling the position of the MOC IGVs 286. Similar control routines may be performed for the BOC 282 where appropriate, where the positions of the MOC IGVs 286, the BOC IGVs 304, the speed of the BOC 228, and the position of the MOC vent valve 320 are all coordinated to achieve the target oxidant flow rate suitable for loading the SEGR gas turbine system 52 according to the $LOAD_{REF}$ 460 and the LOAD input 461.

After the oxidant flow to the combustor 160 is established, the method 450 progresses to performing equivalence ratio control 468. In particular, the controller 118 receives information related to the flow of the oxidant 68 along the oxidant supply path 264, for example from the oxidant flow meter 336. In particular, the oxidant flow meter 336 generates an output, $W_O$ 470, which is the flow rate of the oxidant 68 flowing to the combustor 160. Based on $W_o$ 470 and on a target equivalence ratio 472 (e.g., 1.0 plus or minus 0.01, 0.02, 0.03, 0.04, or 0.05), denoted as $\phi_{REF}$, as well as feedback 473 from equivalence ratio sensor 340, the equivalence ratio control 468 generates a fuel control reference 474 (FCV), which may be a fuel flow control valve reference corresponding to a suitable amount of fuel flow to obtain the target equivalence ratio 472. FCV 474 may be provided to a fuel control 476, which may be one or more modules (e.g., the second module 266) of the second controller 118, such as one or more sets of instructions or routines stored on the controller 118, capable of generating one or more control signals provided to the fuel flow control valve 334. Again, as noted above, there may be one, two, three, or more fuel conduits and each conduit may include one, two, three, or more fuel flow control valves, any one or a combination of which may be addressed collectively or individually using the fuel control 476.

After, or at substantially the same time as, establishing an appropriate fuel flow, the method 450 progresses to performing recycle loop pressure control 478, which is used, at least in part, to establish the amount of the purge gas 42 extracted from the combustor 160. Again, the recycle loop pressure control 478 may correspond to a routine performed by the controller 118 (e.g., one or more modules (e.g., the fourth module 272) of the controller 118. The recycle loop pressure control 478, as depicted, uses a target pressure 480 for the exhaust gas 60 in the exhaust recirculation path 110, denoted as $P_{B\_REF}$, and feedback based on a pressure measurement of the exhaust gas 60, denoted as $P_B$ 481, to generate a reference 484 for the position of product compressor throttling valve 392, denoted as PTV. In one embodiment, $P_B$ 481 may be based on the first pressure of the exhaust gas 60 measured at the first exhaust pressure sensor 380, which is illustrated in FIG. 5 as being positioned downstream of the point at which the purge gas recycle path 416 joins with the exhaust recirculation path 110.

PTV 484, as illustrated, is provided to product compressor control 486, which may correspond to one or more sets of instructions/routines/algorithms stored on the controller 118 (e.g., as a module) for controlling one or more operational parameters of the product compressor 354. Accordingly, PTV 484, which is a throttling valve position command, is used to adjust the suction pressure and therefore flow of the product gas compressor 354. It should be noted that, in addition to the control of the valve 392, other parameters may be adjusted by the recycle loop pressure control 478 to achieve the target exhaust gas pressure (e.g., measured at the first, second, or third exhaust pressure sensors 380, 382, 384), including the recycle flow control valve 418 disposed on the recycle path 416, the vent control valve 388 disposed on the purge vent path 386, or a combination thereof.

In other embodiments, the speed of the product compressor is adjusted in addition to or in lieu of adjusting the throttling valve 392. For example, as noted above with respect to FIG. 5, in embodiments where the driver 394 that drives the product compressor 354 is a steam turbine, the one or more control signals may be used to control a flow control valve for steam to the steam turbine to increase the rotation rate of the shaft 396. In embodiments where the driver 394 is an electric motor, the one or more control signals may be used to adjust a control circuit used to deliver electric power to the driver 394. In other embodiments, the driver 394 may be a gas turbine, such as the gas turbine engine 150. In such embodiments, the one or more control signals may adjust a gear ratio to adjust the speed of the shaft 396.

In adjusting the speed of the product compressor 354, the controller 118 may, in effect, increase the amount of the exhaust gas 42 that is extracted from the combustor 160 along the purge flow path 347. Additionally or alternatively, the IGVs 400 of the product gas compressor 354 may be adjusted in this manner.

The amount of extraction gas flowing to the product compressor 354 (e.g., via control of the throttling valve 392 via PTV 484) may, at least partially, determine the pressure sensed at sensor 380. At least a second adjustment may therefore be made to set pressures within the recycle loop 110. For example, in the embodiment illustrated in FIG. 5, there may be an additional parameter adjustment such that pressures are set at both sensors 380 and 382. Generally, this second adjustment is made via the recycle blower vane angle, wherein the extraction gas sets the pressure at sensor 380 and a recycle blower vane angle reference, $VA_B$ 494, sets the pressure at 382 or sets the pressure rise from 380 to 382. Thus, $VA_B$ 494 may be provided to recycle blower control 498, which may correspond to one or more sets of instructions or control routines stored on the controller 118 for generating control signal outputs to the recycle blower 358. The recycle blower control 498, in one embodiment, may send one or more control signals to the actuator 360 of the recycle blower 358 to adjust a vane angle of the vanes 362 of the blower 358. The vane angle of the vanes 362, as noted above, may affect the extent to which the vanes 362 interact with the exhaust gas 60, where the interaction may be adjustable to provide varying amounts of cooling and motive force to the exhaust gas 60. The recycle blower control 498 may provide the one or more control signals to the actuator 360 of the recycle blower 358 to adjust the vane angle of the vanes 362 to a suitable position to achieve the target pressure.

The method 450 also includes an exhaust temperature control 488, which is used to control the temperature of the exhaust gas 60 in the exhaust recirculation path 110. The exhaust temperature control 488 may correspond to one or more control routines performed by the controller 118 (e.g., by the third module 270), and may adjust the various cooling features disposed along the recirculation path 110 to achieve a target temperature 490, denoted as $T_{EG\_REF}$. In particular, in response to $T_{EG\_REF}$ 490 and a measured exhaust gas temperature 492 (e.g., measured by the exhaust temperature sensor 368 at the outlet of the turbine section 156), denoted as $T_{EG}$, the exhaust temperature control 488 may generate a recycle compressor IGV position reference 496 ($IGV_{RC}$). The reference 496 may correspond to positions for the vanes suitable to achieve the target exhaust temperature 490.

$IGV_{RC}$ 496 is provided to recycle compressor control 500, which, like the other controls, may correspond to one or more stored routines, algorithms, sets of instructions, etc., stored on the controller 118. The recycle compressor control 500 may use the reference $IGV_{RC}$ 496 to generate one or more control signals, which are provided to the actuator 366, which in turn positions IGVs 364 according to the reference 496.

Figure 8:
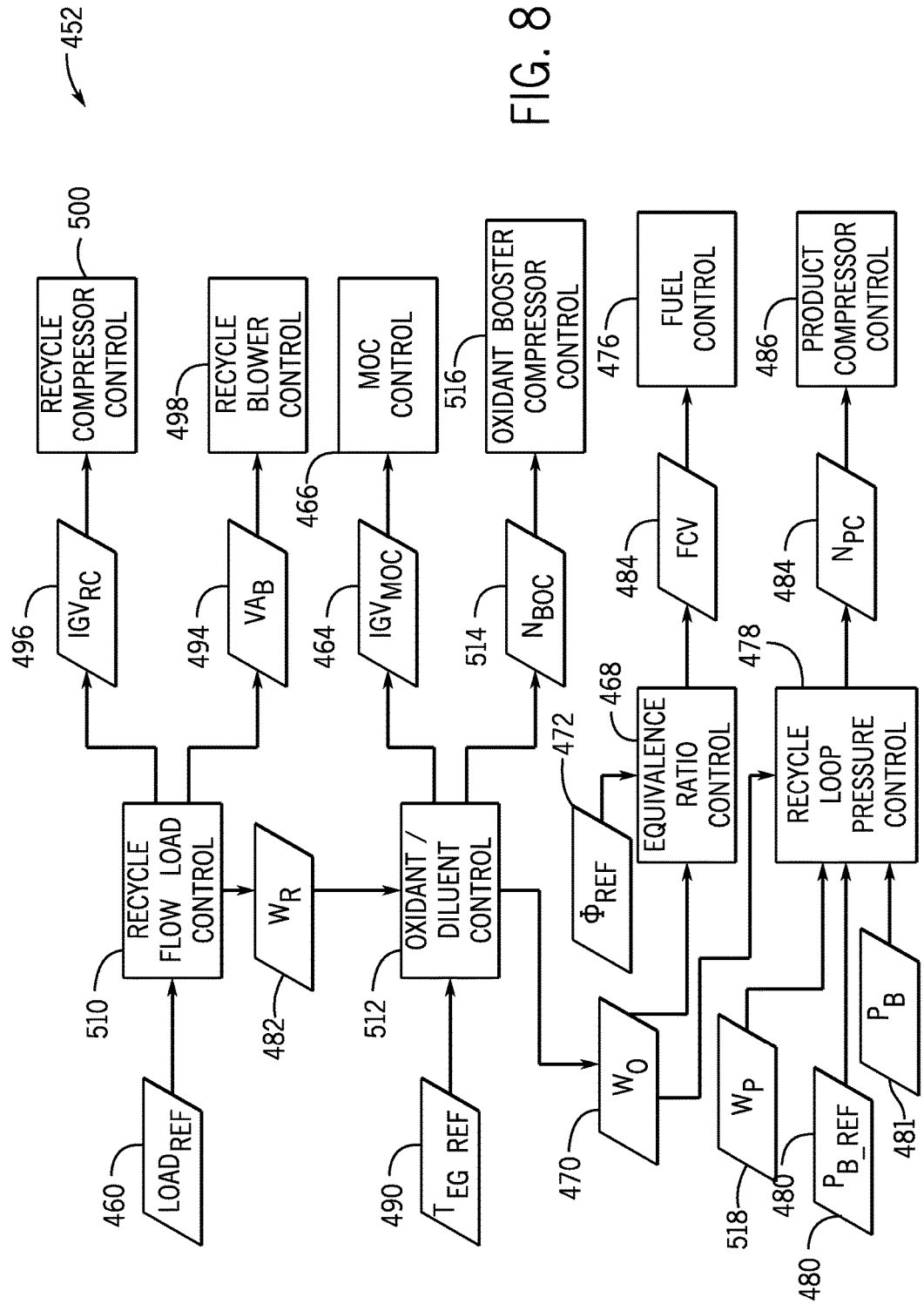
FIG. 8 is a flow chart of an embodiment of a control process for loading and unloading the gas turbine system using the control system of FIG. 5.
Figure 9:
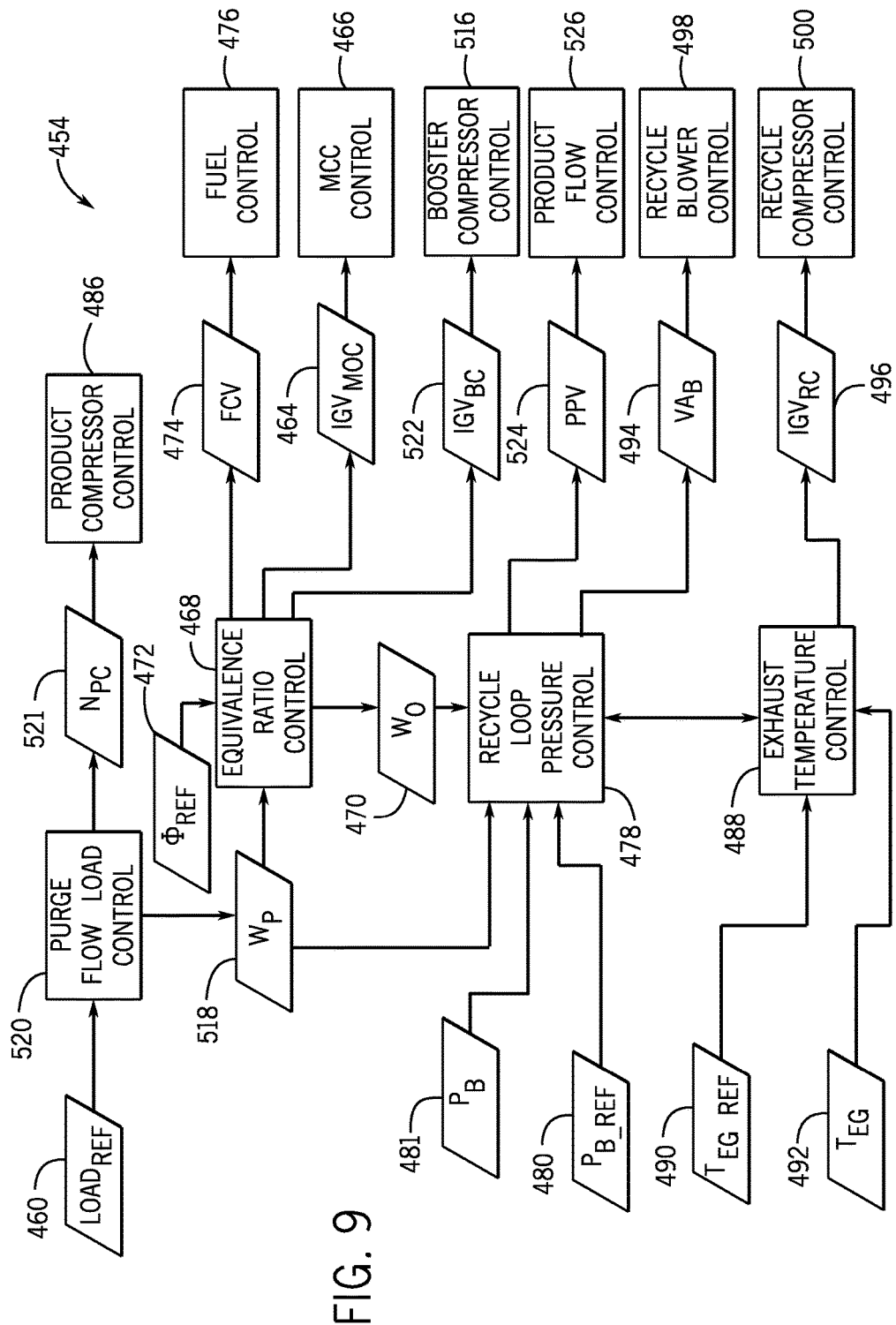
FIG. 9 a flow chart of an embodiment of a control process for loading and unloading the gas turbine system using the control system of FIG. 5.

Moving now to FIG. 8, an embodiment of the method 452 for controlling recycle flow-is depicted. In particular, the method 452 may be performed by the controller 118 to adjust a flow of the exhaust gas 60 through the exhaust recirculation path 110 as a load control parameter, such as in response to loading/unloading of the SEGR turbine system 52. As noted above, the flow through the EG recirculation path 110 can affect temperatures within the turbine section 156, which can at least partially affect the loading on the SEGR gas turbine system 52. It should be noted that while the methods 452, 454 described below include parameters as load control parameters or as primary load control parameters, that the embodiments set forth below with respect to FIGS. 8 and 9 are not intended to limit the discussion set forth above with respect to FIGS. 1-7, and are intended to describe additional or alternative ways in which the SEGR turbine system 52 may be adjusted in response to loading and unloading, and/or in response to a sensed load demand.

In the embodiment illustrated in FIG. 8, the method 452 begins in a similar manner as set forth above in FIG. 7, in that the controller 118 generates, in response to a detected load demand, the $LOAD_{REF}$ 460, which may correspond to, or may be used to generate, a turbine speed/load reference signal. Using $LOAD_{REF}$ 460 (e.g., and LOAD 461), a recycle flow load control 510, which may be implemented on the controller 118 as one or more sets of instructions, algorithms, or routines stored on the controller 118 (e.g., as a module or a part of one or more modules), generates $IGV_{RC}$ 496 and $VA_B$ 494, which correspond to the reference for appropriate positioning of the IGVs 364 and the vanes 362 of the recycle blower 358.

In other words, the recycle flow load control 510 determines appropriate positioning for the IGVs 364 of the compressor section 152 and appropriate positioning for the vanes 362 of the recycle blower 358 for achieving an exhaust flow to the combustor 160 suitable for driving the turbine section 156 at a speed corresponding to the load demand (e.g., in combination with other adjusted parameters, such as adjusted oxidant flow). While not directly measured in some embodiments, the flow rate of the exhaust gas 60 through the recirculation path 110, $W_R$ 482, may be calculated using pressure information obtained from any one or a combination of the first, second, or third exhaust pressure sensors 380, 382, 384.

$W_R$ 482, as depicted, may be used as an input to an oxidant-to-diluent ratio control 512. The oxidant-to-diluent ratio control 512, as with the other controls, may be one or more sets of instructions, algorithms, routines, and so on, stored on the controller 118 as all or part of one or more modules. In one embodiment, the oxidant-to-diluent ratio control 512 is configured to determine an appropriate oxidant flow rate based on, in addition to the parameters discussed above with respect to FIG. 7, $W_R$ 482 and $T_{EG\_REF}$ 490. Based on these example values, the controller 118 may determine the positioning for the MOC IGVs 286 and the speed of the BOC 282 suitable for achieving the oxidant flow rate. $IGV_{MOC}$ 464 may, as discussed above, be provided to the MOC control 466 for the generation of appropriate control signals for the actuator 284.

The oxidant-to-diluent ratio control 512 may, in certain embodiments, generate a speed reference 514 for the BOC 282, denoted as $N_{BOC}$, which may be provided to an oxidant booster compressor control 516. The oxidant booster compressor control 516 may be implemented as described above for the other control modules, and may be used to generate one or more control signals for the BOC driver 308. In particular, in embodiments where the BOC driver 308 is a steam turbine, the one or more control signals may adjust steam flow to the steam turbine to adjust the speed of the driver 308 and, therefore, the BOC 282. In embodiments where the BOC driver 308 is an electric motor, the one or more control signals may control the flow of electric power to the motor to adjust the speed of the driver 308 and, therefore, the BOC 282. In other embodiments, the driver 308 may be a gas turbine, such as the gas turbine engine 150. In such embodiments, the one or more control signals may adjust a gear ratio to adjust the speed of the BOC 282.

The method 452 may also include performing equivalence ratio control 468 in a similar manner as described above with respect to FIG. 7. In particular, the equivalence ratio control uses the target equivalence ratio 472 (e.g., 1.0 plus or minus 0.01, 0.02, 0.03, 0.04, or 0.05) and the measured oxidant flow rate 470 (e.g., measured using oxidant flow meter 336), as well as feedback from equivalence ratio sensors, etc., to determine an appropriate fuel flow rate suitable for combustion within the combustor 160 at the target equivalence ratio 472. The determined fuel flow rate may then be used to generate the fuel flow reference 484, which is provided to the fuel control 476. The fuel control 476 may operate one or more fuel flow control valves as described above with respect to FIG. 7 to adjust the fuel flow rate.

The method 452 also performs recycle loop pressure control by controlling the product compressor 354 as described above with respect to FIG. 7. However, the recycle loop pressure control 478 in FIG. 8 may also utilize a flow rate 518 of the exhaust gas 42 flowing through the purge flow path 347, denoted as $W_P$ 518. Such a measurement may be desirable to determine appropriate valve positioning throughout the EG supply system 78, and/or to determine available flow of the exhaust 42 and/or exhaust 60 for recirculation through the EG recirculation path 110.

FIG. 9 is a process flow diagram of an embodiment of the method 454 for performing purge flow-based load control, where the primary load control parameter is the exhaust extracted from the combustor 160 (e.g., from a compressor discharge casing). Again, while it is presently contemplated that oxidant-based control may have a greater affect on loading and unloading of the turbine system 52, the present disclosure is also intended to encompass configurations in which the purge flow is controlled to provide additional flexibility in the operation of the turbine system 52, for example to make fine output adjustments, or to respond to events resulting from loading and unloading of the system.

In the method 454 of FIG. 9, $LOAD_{REF}$ 460 (e.g., and LOAD 461) is provided to purge flow load control 520, which determines an appropriate flow of the exhaust gas 42 through the purge flow path 347 to meet the load demand (e.g., in addition to other adjustments, such as to the oxidant flow). For example, adjusting the amount of exhaust gas 42 through the purge flow path 347 may affect the amount of exhaust gas provided to the combustor 160 as exhaust gas diluent. This has an effect on the firing temperatures in the combustor 160, which can at least partially affect the speed of the gas turbine engine 150 and, therefore, the electrical power output by the electrical generator 276.

The purge flow load control 520, like the control modules discussed above, may be implemented as one or more sets of instructions, routines, and/or algorithms on stored on the controller 118, and/or implemented as all or part of one or more modules on the controller 118. The purge flow load control 520 generates, in the illustrated embodiment, $N_{PC}$ 521, which is provided to the product compressor control 486 as a speed input to adjust a speed of the driver 394. However, the purge flow adjustment is not limited to adjusting the speed of the product compressor 354. For example, the IGVs 400 of the product compressor 354 may be adjusted (e.g., using the actuator 402 and one or more suitably configured control signals). Additionally or alternatively, the purge flow control valve 392 may be adjusted using one or more suitably configured control signals. Accordingly, in addition to, or in lieu of $N_{PC}$ 521, other references may be generated, such as a positional reference for the IGVs 400 of the product compressor 354 and/or the purge flow control valve 392, such as the throttling valve control 484.

The extracted exhaust gas 42 flowing along the purge flow path 347 may be measured, for example using exhaust flow meter 280, to provide $W_P$ 518. $W_P$ 518, as depicted, may be used as an input for the equivalence ratio control 468. Such a measurement may be used, in combination with others, to determine oxidant and fuel flow rates suitable to support the loading on the gas turbine engine 150 while also maintaining the equivalence ratio within the combustor 160 at the target value 472. Accordingly, the equivalence ratio control of FIG. 9 outputs the FCV 474 and the $IGV_{MOC}$ 464 references, which are provided to the fuel control 476 and the MOC control 466 for adjusting one or more fuel flow control valves and the operation of the MOC, respectively, as discussed with respect to FIG. 7. In addition, in certain embodiments, the equivalence ratio control 468 also outputs a position reference 522 for the BOC IGVs 304, denoted as $IGV_{BC}$. $IGV_{BC}$ 522 may be used to represent an appropriate positioning for the BOC IGVs 304, which is determined, in one embodiment, based upon a balancing of the purge flow, the fuel flow, and the oxidant flow from the MOC 188. The booster compressor control 516 may use $IGV_{BC}$ 522 to generate one or more suitably configured control signals for the actuator 306, which adjusts the positioning of the BOC IGVs 304 to attain the target oxidant flow rate to the combustor 160.

The recycle loop pressure control 478 may be performed using $W_O$ 470, $P_{B\_REF}$ 480, $P_B$ 481, and $W_P$ 518 as inputs. In addition, feedback may be provided back and forth between the recycle loop pressure control 478 and the exhaust temperature control 488. The recycle loop pressure control 478 may generate a product gas recycle flow reference 524, denoted as PPV, and is representative of a position of one or more recycle flow control valves (e.g., valve 418 positioned along the recycle path 416). The recycle loop pressure control 478 may also generate $VA_B$ 494 for the recycle blower control 498.

Product flow control 526, which may correspond to one or more sets of stored instructions, routines, or algorithms, and may be implemented as all or part of one or more modules of the controller 118, uses PPV 524 to generate one or more control signals configured to adjust at least the recycle flow control valve 418 positioned along the recycle path 416. As discussed above with respect to FIG. 5, adjusting the position of the recycle flow control valve 418 may adjust the flow of product gas (or recycled exhaust gas 42) provided to the exhaust recirculation path 110. Again, this may increase the pressure of the exhaust gas 60 within the exhaust recirculation path 110, which may be used to support lower temperatures in the combustor 160.

In the illustrated embodiment, the method 454 includes performing exhaust temperature control 488. As discussed in detail with respect to FIG. 7, the exhaust temperature control 488 may use the sensed exhaust temperature 492 and the target exhaust temperature 490, among other possible parameters, to determine appropriate control parameters for the compressor section 152 and the recycle blower 358. The operation of the compressor section 152, for example a position of its IGVs 364 may be adjusted to achieve the target temperature for the exhaust gas 66. The target temperature for the exhaust gas 66 may be based on a variety of factors, including the specifications of the compressor section 152 (e.g., a maximum temperature rating), and/or a desired inlet temperature for the combustor 160.

Additional Description

The present embodiments provide a system and method for controlling the loading and unloading of exhaust gas recirculation gas turbine engines. It should be noted that any one or a combination of the features described above may be utilized in any suitable combination. Indeed, all permutations of such combinations are presently contemplated. By way of example, the following clauses are offered as further description of the present disclosure:

Embodiment 1. A gas turbine system comprising a turbine combustor configured to combust a compressed oxidant and a fuel in the presence of an exhaust gas diluent generated from an exhaust gas to produce combustion products; an oxidant supply path fluidly coupled to the turbine combustor and configured to flow the compressed oxidant to the turbine combustor at an oxidant flow rate; a turbine configured to extract work from the combustion products to produce an exhaust gas, wherein the turbine causes a shaft of the gas turbine system to rotate when the work is extracted from the combustion products; an electrical generator configured to generate electrical power in response to rotation by the shaft; and a controller, comprising: one or more tangible, non-transitory, machine readable media collectively storing one or more sets of instructions; and one or more processing devices configured to execute the one or more sets of instructions to: receive data indicative of a target load for the electrical generator; and perform load control in response to the target load by adjusting the oxidant flow rate along the oxidant flow path as a primary load control parameter, wherein adjusting the oxidant flow rate adjusts combustion within the turbine combustor to change a rotational speed of the shaft.

Embodiment 2. The system of embodiment 1, comprising a main oxidant compressor configured to generate the compressed oxidant along the oxidant supply path, wherein the oxidant supply path extends from the main oxidant compressor to the turbine combustor, the main oxidant compressor comprises main oxidant compressor inlet guide vanes configured to adjust an amount of oxidant received for compression to generate the compressed oxidant, and wherein the one or more processing devices are configured to execute the one or more sets of instructions to adjust a position of the inlet guide vanes to adjust the oxidant flow rate.

Embodiment 3. The system of any preceding embodiment, comprising a booster oxidant compressor disposed along the oxidant supply path between the main oxidant compressor and the turbine combustor, wherein the booster oxidant compressor is driven by a booster oxidant compressor driver, and the booster oxidant compressor is configured to boost a pressure of the compressed oxidant along the oxidant supply path, and wherein the one or more processing devices are configured to execute the one or more sets of instructions to adjust a speed of the booster oxidant compressor driver to adjust the oxidant flow rate.

Embodiment 4. The system of any preceding embodiment, comprising a booster oxidant compressor disposed along the oxidant supply path between the main oxidant compressor and the turbine combustor, wherein the booster oxidant compressor comprises booster oxidant compressor inlet guide vanes configured to adjust an amount of compressed oxidant received and compressed by the booster oxidant compressor, and wherein the one or more processing devices are configured to execute the one or more sets of instructions to adjust a position of the booster oxidant compressor inlet guide vanes to adjust the oxidant flow rate.

Embodiment 5. The system of any preceding embodiment, comprising a fuel supply path fluidly coupled to the turbine combustor and configured to flow the fuel to the turbine combustor at a fuel flow rate, wherein the one or more processing devices are configured to execute the one or more sets of instructions to adjust the fuel flow rate in response to the load control in which the oxidant flow rate is adjusted.

Embodiment 6. The system of any preceding embodiment, wherein the one or more processing devices are configured to execute the one or more sets of instructions to perform equivalence ratio control after performing the load control, and the equivalence ratio control adjusts the fuel flow rate in response to the adjustment in the oxidant flow rate to adjust the equivalence ratio of the fuel and the oxidant in the turbine combustor to a target equivalence ratio.

Embodiment 7. The system of any preceding embodiment, wherein the target equivalence ratio is 1.0 plus or minus 0.01, 0.02, 0.03, 0.04, or 0.05.

Embodiment 8. The system of any preceding embodiment, wherein the equivalence ratio control adjusts one or more fuel flow control valves disposed along the fuel supply path to adjust the fuel flow rate.

Embodiment 9. The system of any preceding embodiment, comprising an exhaust gas recirculation (EGR) system, wherein the EGR system is configured to recirculate the exhaust gas along an exhaust recycle loop extending from the turbine to an exhaust gas compressor configured to supply the exhaust gas diluent to the turbine combustor, and wherein the one or more processing devices are configured to execute the one or more sets of instructions to perform exhaust recycle loop pressure control after performing the equivalence ratio control, and the exhaust recycle loop pressure control is configured to control a pressure of the exhaust gas within the exhaust recycle loop.

Embodiment 10. The system of any preceding embodiment, wherein the exhaust recycle loop pressure control is performed in response to at least an oxidant flow rate measurement and a target pressure for the exhaust gas.

Embodiment 11. The system of any preceding embodiment, comprising: an exhaust extraction path configured to flow a portion of the exhaust gas diluent as an extracted exhaust gas from the recycle compressor to a product gas compressor configured to compress the extracted exhaust gas into a product gas; and a product gas recycle path configured to flow the product gas to the exhaust recycle loop; and wherein the recycle loop pressure control is configured to control the pressure of the exhaust gas by adjusting an amount of the product gas provided to the exhaust recycle loop.

Embodiment 12. The system of any preceding embodiment, wherein the amount of the product gas provided to the exhaust recycle loop is adjusted by adjusting a product gas flow control valve disposed along the product gas recycle path, a speed of a driver of the product gas compressor, one or more product gas compressor inlet guide vanes of the product gas compressor, or any combination thereof.

Embodiment 13. The system of any preceding embodiment, wherein the one or more processing devices are configured to execute the one or more sets of instructions to perform exhaust temperature control after performing the exhaust recycle loop pressure control, and the exhaust temperature control is configured to control a temperature of the exhaust gas within the exhaust recycle loop.

Embodiment 14. The system of any preceding embodiment, comprising a recycle blower disposed along the exhaust recycle path between the turbine and the recycle compressor, wherein the exhaust temperature control adjusts a vane angle of the recycle blower, a position of recycle compressor inlet guide vanes of the recycle compressor, or a combination thereof, to adjust the temperature of the exhaust gas within the exhaust recycle loop.

Embodiment 15. A system comprising one or more tangible, non-transitory, machine readable media collectively storing one or more sets of instructions executable by one or more processing devices to: receive a load reference indicative of a target loading for a gas turbine system; determine an oxidant flow rate associated with the target loading, wherein the oxidant flow rate corresponds to a flow of a compressed oxidant along an oxidant supply path from a main oxidant compression system to a turbine combustor of the gas turbine system; generate one or more oxidant flow control signals for input to the main oxidant compression system to cause the main oxidant compression system to adjust the flow of the compressed oxidant to the oxidant flow rate associated with the target loading; determine a fuel flow rate based on the oxidant flow rate associated with the target loading, wherein the fuel flow rate corresponds to a flow of a fuel along a fuel supply path to the turbine combustor; and generate one or more fuel flow control signals for input to a fuel flow control system, wherein the one or more fuel flow control signals are configured to cause the fuel flow control system to adjust the flow of the fuel to enable combustion at a target equivalence ratio between the fuel and the oxidant in the presence of an exhaust gas diluent within the turbine combustor.

Embodiment 16. The system of any preceding embodiment, wherein the one or more oxidant flow control signals are configured to cause a positional adjustment of one or more main oxidant compressor inlet guide vanes of a main oxidant compressor of the main oxidant compression system.

Embodiment 17. The system of any preceding embodiment, wherein the one or more oxidant flow control signals are configured to cause a positional adjustment of one or more booster oxidant compressor inlet guide vanes of a booster oxidant compressor of the main oxidant compression system.

Embodiment 18. The system of any preceding embodiment, wherein the one or more oxidant flow control signals are configured to cause a change in speed of a driver of a booster oxidant compressor of the main oxidant compression system.

Embodiment 19. The system of any preceding embodiment, wherein the one or more fuel flow control signals are configured to cause a change in a position of one or more fuel flow control valves of the fuel flow control system.

Embodiment 20. The system of any preceding embodiment, wherein the one or more sets of instructions are executable by one or more processing devices to perform an exhaust gas recirculation loop pressure control routine, wherein the exhaust gas recirculation loop pressure control routine is configured to control a pressure of an exhaust gas flowing through an exhaust recirculation path in response to a target pressure for the exhaust gas, the oxidant flow rate associated with the target loading, and feedback related to a flow rate of the exhaust gas flowing through the exhaust recirculation path, or any combination thereof, and wherein the exhaust recirculation path extends from a turbine of the gas turbine system to a recycle compressor configured to produce the exhaust gas diluent.

Embodiment 21. The system of any preceding embodiment, wherein the exhaust gas recirculation loop pressure control routine comprises controlling a flow of the exhaust gas diluent from the recycle compressor as an exhaust purge flow to a product compressor configured to compress the exhaust purge flow into a product gas.

Embodiment 22. The system of any preceding embodiment, wherein the exhaust gas recirculation loop pressure control routine comprises controlling the flow of the exhaust purge flow from the recycle compressor to the product compressor by adjusting a speed of a driver of the product compressor, by adjusting a flow control valve positioned along a purge recycle flow path configured to flow the exhaust purge flow to the exhaust recirculation path, or a combination thereof.

Embodiment 23. The system of any preceding embodiment, wherein the one or more sets of instructions are executable by one or more processing devices to perform an exhaust gas temperature control routine, wherein the exhaust gas temperature control routine is configured to control a temperature of the exhaust gas flowing through the exhaust recirculation path in response to a sensed temperature of the exhaust gas exiting the turbine and a target temperature for the exhaust gas exiting the turbine.

Embodiment 24. The system of any preceding embodiment, wherein the exhaust gas temperature control routine controls the temperature of the exhaust gas flowing through the exhaust recirculation path by adjusting a vane angle of a recycle blower positioned along the exhaust recirculation path, by adjusting a position of recycle compressor inlet guide vanes of the recycle compressor, or a combination thereof.

Embodiment 25

A gas turbine system comprising: a turbine combustor configured to combust an oxidant and a fuel; a turbine driven by combustion products from the turbine combustor; an exhaust gas compressor driven by the turbine via a shaft, wherein the exhaust gas compressor is configured to compress and supply an exhaust gas to the turbine combustor as an exhaust gas diluent; an exhaust gas recirculation (EGR) system, wherein the EGR system is configured to recirculate the exhaust gas along an exhaust recirculation path from the turbine to the exhaust gas compressor; an electrical generator configured to generate electrical power in response to rotation by the shaft; and a controller, comprising: one or more tangible, non-transitory, machine readable media collectively storing one or more sets of instructions; and one or more processing devices configured to execute the one or more sets of instructions to: receive data indicative of a target load for the electrical generator; and perform load control in response to the target load by adjusting an exhaust flow rate of the exhaust gas recirculating along the exhaust recirculation path as a primary load control parameter, wherein adjusting the exhaust flow rate adjusts the operation of the turbine to change a rotational speed of the shaft.

Embodiment 26. The system of any preceding embodiment, wherein the one or more sets of instructions are executable by the one or more processing devices to adjust the exhaust flow rate by adjusting a position of exhaust gas compressor inlet guide vanes of the exhaust gas compressor.

Embodiment 27. The system of any preceding embodiment, wherein the EGR system comprises an exhaust recycle blower positioned along the exhaust recirculation path, and wherein the one or more sets of instructions are executable by the one or more processing devices to adjust the exhaust flow rate by adjusting a vane angle of the exhaust recycle blower.

Embodiment 28. The system of any preceding embodiment, wherein the one or more sets of instructions are executable by the one or more processing devices to perform an oxidant to exhaust gas diluent ratio control routine configured to control a ratio of the oxidant to the exhaust gas diluent in the turbine combustor.

Embodiment 29. The system of any preceding embodiment, comprising an oxidant supply path configured to flow the oxidant to the turbine combustor at an oxidant flow rate, wherein the oxidant to exhaust gas diluent ratio control routine is configured to control the oxidant flow rate to control the ratio of the oxidant to the exhaust gas diluent in the turbine combustor in response to data indicative of the exhaust flow rate.

Embodiment 30. The system of any preceding embodiment, wherein the oxidant to exhaust gas diluent ratio control routine is configured to control the oxidant flow rate to control the ratio of the oxidant to the exhaust gas diluent in the turbine combustor in response to data indicative of the exhaust flow rate and a target temperature of exhaust gas exiting the turbine.

Embodiment 31. The system of any preceding embodiment, wherein the one or more sets of instructions are executable by the one or more processing devices to control the oxidant flow rate by adjusting main oxidant compressor inlet guide vanes of a main oxidant compressor configured to compress and supply the oxidant along the oxidant supply path to the turbine combustor.

Embodiment 32. The system of any preceding embodiment, wherein the one or more sets of instructions are executable by the one or more processing devices to control the oxidant flow rate by adjusting a speed of a driver of a booster oxidant compressor configured to boost a pressure of the oxidant along the oxidant supply path.

Embodiment 33. The system of any preceding embodiment, wherein the one or more sets of instructions are executable by the one or more processing devices to perform an equivalence ratio control routine configured to control a ratio of the oxidant to the fuel in the turbine combustor.

Embodiment 34. The system of any preceding embodiment, comprising a fuel supply path configured to flow the fuel to the turbine combustor at a fuel flow rate, wherein the equivalence ratio control routine is configured to control the fuel flow rate to control the ratio of the oxidant to the fuel in the turbine combustor in response to data indicative of the oxidant flow rate and a target equivalence ratio.

Embodiment 35. The system of any preceding embodiment, wherein the one or more sets of instructions are executable by the one or more processing devices to control the fuel flow rate by adjusting one or more fuel flow control valves disposed along the fuel supply path.

Embodiment 36. The system of any preceding embodiment, wherein the one or more processing devices are configured to execute the one or more sets of instructions to perform exhaust recycle loop pressure control after performing the equivalence ratio control, and the exhaust recycle loop pressure control is configured to control a pressure of the exhaust gas within the exhaust recirculation path.

Embodiment 37. The system of any preceding embodiment, wherein the exhaust recycle loop pressure control is performed in response to at least an oxidant flow rate measurement and a target pressure for the exhaust gas.

Embodiment 38. The system of any preceding embodiment, comprising: an exhaust extraction path configured to flow a portion of the exhaust gas diluent as an extracted exhaust gas from the exhaust gas compressor to a product gas compressor configured to compress the extracted exhaust gas into a product gas; and a product gas recycle path configured to flow the product gas to the exhaust recirculation path; and wherein the recycle loop pressure control is configured to control the pressure of the exhaust gas by adjusting an amount of the product gas provided to the exhaust recirculation path.

Embodiment 39. The system of any preceding embodiment, wherein the amount of the product gas provided to the exhaust recirculation path is adjusted by adjusting a product gas flow control valve disposed along the product gas recycle path, a speed of a driver of the product gas compressor, product gas compressor inlet guide vanes of the product gas compressor, or any combination thereof.

Embodiment 40. A gas turbine system comprising: a turbine combustor configured to combust an oxidant and a fuel; a turbine driven by combustion products from the turbine combustor; an exhaust gas compressor driven by the turbine via a shaft, wherein the exhaust gas compressor is configured to compress and supply an exhaust gas to the turbine combustor as an exhaust gas diluent; an exhaust gas recirculation (EGR) system, wherein the EGR system is configured to recirculate the exhaust gas along an exhaust recirculation path from the turbine to the exhaust gas compressor; an exhaust extraction path configured to flow an amount of the exhaust gas diluent as an extracted exhaust gas from the exhaust gas compressor to a product gas path configured to deliver the extracted exhaust gas to a downstream process as a product gas; an electrical generator configured to generate electrical power in response to rotation by the shaft; and a controller, comprising: one or more tangible, non-transitory, machine readable media collectively storing one or more sets of instructions; and one or more processing devices configured to execute the one or more sets of instructions to: receive data indicative of a target load for the electrical generator; and perform load control in response to the target load by adjusting the amount of the extracted exhaust gas flowed to the product gas path.

Embodiment 41. The system of any preceding embodiment, wherein the product gas path comprises a product gas compressor configured to compress the extracted exhaust gas into the product gas.

Embodiment 42. The system of any preceding embodiment, wherein the one or more sets of instructions are executable by the one or more processing devices to adjust the amount of the extracted exhaust gas flowed to the product gas path by adjusting a speed of a driver of the product gas compressor.

Embodiment 43. The system of any preceding embodiment, wherein the one or more sets of instructions are executable by the one or more processing devices to adjust product gas compressor inlet guide vanes of the product gas compressor.

Embodiment 44. The system of any preceding embodiment, wherein the one or more sets of instructions are executable by the one or more processing devices to perform an equivalence ratio control routine configured to control a ratio of the oxidant to the fuel in the turbine combustor in response to a flow rate of the product gas along the product gas path and a target equivalence ratio.

Embodiment 45. The system of any preceding embodiment, wherein the target equivalence ratio is 1.0 plus or minus 0.01, 0.02, 0.03, 0.04, or 0.05.

Embodiment 46. The system of any preceding embodiment, comprising an oxidant supply path configured to flow the oxidant to the turbine combustor at an oxidant flow rate, wherein the equivalence ratio control routine is configured to control the oxidant flow rate to control the ratio of the oxidant to the fuel in the turbine combustor.

Embodiment 47. The system of any preceding embodiment, wherein the one or more sets of instructions are executable by the one or more processing devices to control the oxidant flow rate by adjusting main oxidant compressor inlet guide vanes of a main oxidant compressor configured to compress and supply the oxidant along the oxidant supply path to the turbine combustor.

Embodiment 48. The system of any preceding embodiment, wherein the one or more sets of instructions are executable by the one or more processing devices to control the oxidant flow rate by adjusting a speed of a driver of a booster oxidant compressor configured to boost a pressure of the oxidant along the oxidant supply path.

Embodiment 49. The system of any preceding embodiment, comprising a fuel supply path configured to flow the fuel to the turbine combustor at a fuel flow rate, wherein the equivalence ratio control routine is configured to control the fuel flow rate to control the ratio of the oxidant to the fuel in the turbine combustor.

Embodiment 50. The system of any preceding embodiment, wherein the one or more sets of instructions are executable by the one or more processing devices to control the fuel flow rate by adjusting one or more fuel flow control valves disposed along the fuel supply path.

Embodiment 51. The system of any preceding embodiment, wherein the one or more processing devices are configured to execute the one or more sets of instructions to perform an exhaust recycle loop pressure control routine in response to an oxidant flow rate of the oxidant flowing to the turbine combustor, a product gas flow rate of the product gas flowing along the product gas flow path, and a target pressure for the exhaust gas along the exhaust recirculation path, and wherein the exhaust recycle loop pressure control routine is configured to control a pressure of the exhaust gas within the exhaust recirculation path.

Embodiment 52. The system of any preceding embodiment, comprising a product gas recycle path configured to flow the product gas to the exhaust recirculation path, and wherein the recycle loop pressure control routine is configured to control the pressure of the exhaust gas by adjusting an amount of the product gas provided to the exhaust recirculation path.

Embodiment 53. The system of any preceding embodiment, wherein the recycle loop pressure control routine is configured to control the amount of the product gas provided to the exhaust recirculation path by adjusting one or more product pressure valves positioned along the product gas recycle path, and the one or more product pressure valves are configured to adjust a product gas flow rate of the product gas along the product gas recycle path.

Embodiment 54. The system of any preceding embodiment, wherein the one or more sets of instructions are executable by one or more processing devices to perform an exhaust gas temperature control routine, wherein the exhaust gas temperature control routine is configured to control a temperature of the exhaust gas flowing through the exhaust recirculation path in response to a sensed temperature of the exhaust gas exiting the turbine and a target temperature for the exhaust gas exiting the turbine.

Embodiment 55. The system of any preceding embodiment, wherein the exhaust gas temperature control routine controls the temperature of the exhaust gas flowing through the exhaust recirculation path by adjusting a vane angle of a recycle blower positioned along the exhaust recirculation path, by adjusting a position of exhaust compressor inlet guide vanes of the exhaust compressor, or a combination thereof.

Embodiment 56. A gas turbine system comprising: a turbine combustor configured to combust an oxidant and a fuel; a turbine driven by combustion products from the turbine combustor; an exhaust gas compressor driven by the turbine via a shaft, wherein the exhaust gas compressor is configured to compress and supply an exhaust gas to the turbine combustor as an exhaust gas diluent; an exhaust gas recirculation (EGR) system, wherein the EGR system is configured to recirculate the exhaust gas along an exhaust recirculation path from the turbine to the exhaust gas compressor; an exhaust extraction path configured to flow an amount of the exhaust gas diluent as an extracted exhaust gas from the exhaust gas compressor to a product gas path configured to deliver the extracted exhaust gas to a downstream process as a product gas; an electrical generator configured to generate electrical power in response to rotation by the shaft; and a controller, comprising: one or more tangible, non-transitory, machine readable media collectively storing one or more sets of instructions; and one or more processing devices configured to execute the one or more sets of instructions to: receive data indicative of a target load for the electrical generator; and perform load control in response to the target load by adjusting the amount of the extracted exhaust gas flowed to the product gas path as the primary load control parameter, by adjusting an amount of the oxidant provided to the combustor as the primary load control parameter, or by adjusting a flow of the exhaust gas along the exhaust recirculation path as the primary load control parameter.

Embodiment 57. The system of any preceding embodiment, wherein the one or more sets of instructions are executable by the one or more processing devices to adjust the amount of the extracted exhaust gas flowed to the product gas path as the primary load control parameter.

Embodiment 58

The system of any preceding embodiment, wherein the one or more sets of instructions are executable by the one or more processing devices to adjust the amount of the oxidant provided to the combustor as the primary load control parameter.

Embodiment 59. The system of any preceding embodiment, wherein the one or more sets of instructions are executable by the one or more processing devices to adjust the flow of the exhaust gas along the exhaust recirculation path as the primary load control parameter.

Embodiment 60. The system of any preceding embodiment, wherein the combustion products have substantially no unburnt fuel or oxidant remaining.

Embodiment 61. The system of any preceding embodiment, wherein the combustion products have less than approximately 10, 20, 30, 40, 50, 60, 70, 80, 90, 100, 200, 300, 400, 500, 1000, 2000, 3000, 4000, or 5000 parts per million by volume (ppmv) of oxidant unburnt fuel, nitrogen oxides (e.g., $NO_X$), carbon monoxide (CO), sulfur oxides (e.g., $SO_X$), hydrogen, and other products of incomplete combustion.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gas turbine system comprising:
a turbine combustor configured to combust a compressed oxidant and a fuel in the presence of an exhaust gas diluent generated from an exhaust gas to produce combustion products;
an oxidant supply path fluidly coupled to the turbine combustor and configured to flow the compressed oxidant from a main oxidant compression system to the turbine combustor at an oxidant flow rate;
a turbine configured to extract work from the combustion products to produce the exhaust gas, wherein the turbine causes a shaft of the gas turbine system to rotate when the work is extracted from the combustion products:
a purge stream that receives extracted combustion products directly from the combustor and directs the extracted combustion products from the combustor to an exhaust gas supply system, wherein an extracted combustion products flow meter is disposed along the purge stream;
a product gas recycle path fluidly coupled between the combustor and the exhaust gas supply system, wherein the purge stream is configured to direct the extracted combustion products from the purge stream to the turbine combustor;
an electrical generator configured to generate electrical power in response to rotation by the shaft; and
a controller, comprising:
a processor configured to:
receive data indicative of a target load for the gas turbine system electrical generator, wherein the data indicative of the target load for the gas turbine system electrical generator comprises feedback from a power meter coupled to the gas turbine system electrical generator;
receive feedback from the extracted combustion products flow meter, wherein the feedback is indicative of a flow rate of the extracted combustion products from the combustor; and
perform an oxidant load control in response to the target load and the feedback indicative of the flow rate of the extracted combustion products from the combustor by adjusting the oxidant flow rate along the oxidant supply path as a primary load control parameter, wherein adjusting the oxidant flow rate adjusts combustion parameters within the turbine combustor to change a rotational speed of the shaft.

2. The gas turbine system of claim 1, comprising a main oxidant compressor of the main oxidant compression system configured to generate the compressed oxidant along the oxidant supply path, wherein the oxidant supply path extends from the main oxidant compressor to the turbine combustor, the main oxidant compressor comprises main oxidant compressor inlet guide vanes configured to adjust an amount of oxidant received for compression to generate the compressed oxidant, and wherein the processor is configured to adjust a position of the inlet guide vanes to adjust the oxidant flow rate.

3. The gas turbine system of claim 1, comprising a fuel supply path fluidly coupled to the turbine combustor and configured to flow the fuel to the turbine combustor at a fuel flow rate, wherein the processor is configured to perform a fuel load control by adjusting the fuel flow rate in response to the oxidant load control.

4. The gas turbine system of claim 3, wherein the processor is configured to perform equivalence ratio control after performing the oxidant load control, and the equivalence ratio control adjusts the fuel flow rate in response to the adjustment in the oxidant flow rate to adjust the equivalence ratio of the fuel and the compressed oxidant in the turbine combustor to a target equivalence ratio.

5. The gas turbine system of claim 4, comprising an exhaust gas recirculation (EGR) system, wherein the EGR system is configured to recirculate the exhaust gas along an exhaust recycle loop extending from the turbine to an exhaust gas compressor configured to supply the exhaust gas diluent to the turbine combustor, and wherein the processor is configured to perform exhaust recycle loop pressure control after performing the equivalence ratio control, the fuel load control, or both, and the exhaust recycle loop pressure control is configured to control a pressure of the exhaust gas within the exhaust recycle loop.

6. The gas turbine system of claim 5, wherein the processor is configured to perform turbine temperature control after performing the exhaust recycle loop pressure control, and the turbine temperature control is configured to control a turbine temperature comprising a temperature of the exhaust gas within the exhaust recycle loop, a firing temperature in the turbine, or any other temperature in the turbine combustor or turbine, or any combination thereof.

7. The gas turbine system of claim 6, comprising a recycle blower disposed along the exhaust recycle path between the turbine and the recycle exhaust gas compressor, wherein the turbine temperature control adjusts a vane angle of the recycle blower, a position of recycle exhaust gas compressor inlet guide vanes of the recycle exhaust gas compressor, or a combination thereof, to adjust the turbine temperature in response to a sensed pressure of the exhaust gas within the exhaust recycle loop, or in response to feedback relating to one or more operating limits of the gas turbine system, or both.

8. The gas turbine system of claim 2, comprising an oxidant vent path diverging from the oxidant supply path and fluidly coupling the oxidant supply path to an oxidant vent, and an oxidant vent control valve disposed along the oxidant vent path configured to adjust oxidant flow along the oxidant vent path, wherein the processor is configured to control the oxidant vent valve to adjust the oxidant flow rate.

* * * * *